United States Patent
Whitney et al.

(10) Patent No.: US 11,392,727 B2
(45) Date of Patent: Jul. 19, 2022

(54) GENERATING SPACE MODELS AND GEOMETRY MODELS USING A MACHINE LEARNING SYSTEM WITH MULTI-PLATFORM INTERFACES

(71) Applicant: Herman Miller, Inc., Zeeland, MI (US)

(72) Inventors: Dudley E. Whitney, Annapolis, MD (US); James L. Van Dragt, Zeeland, MI (US); Christopher J. Rysko, Grandville, MI (US); Cindy Y. Vannoy, West Olive, MI (US); Christopher L. Taylor, Saugatuck, MI (US)

(73) Assignee: Herman Miller, Inc., Zeeland, MI (US)

( * ) Notice: Subject to any disclaimer, the term of this patent is extended or adjusted under 35 U.S.C. 154(b) by 0 days.

(21) Appl. No.: 17/350,641

(22) Filed: Jun. 17, 2021

(65) Prior Publication Data

US 2021/0397759 A1     Dec. 23, 2021

Related U.S. Application Data

(60) Provisional application No. 63/041,535, filed on Jun. 19, 2020.

(51) Int. Cl.
| | | |
|---|---|---|
| *G06F 30/10* | (2020.01) | |
| *G06F 30/27* | (2020.01) | |
| *G06K 9/62* | (2022.01) | |
| *G06N 20/00* | (2019.01) | |
| *G06F 30/13* | (2020.01) | |

(Continued)

(52) U.S. Cl.
CPC ........ *G06F 30/10* (2020.01); *G06F 16/24578* (2019.01); *G06F 30/12* (2020.01);
(Continued)

(58) Field of Classification Search
CPC .... G06F 30/00; G06F 30/12; G06F 16/24578; G06F 30/13; G06F 30/27; G06F 30/10;
(Continued)

(56) References Cited

U.S. PATENT DOCUMENTS

2020/0134748 A1*   4/2020   Koon ................ G06F 16/24578

OTHER PUBLICATIONS

Diakite, Abdoulaye Abou et al., "Valid Space Description in BIM for 3D Indoor Navigation", Jul.-Sep. 2016, International Journal of 3-D Information Modeling. (Year: 2016).*

(Continued)

*Primary Examiner* — Cedric Johnson
(74) *Attorney, Agent, or Firm* — Banner & Witcoff, Ltd.

(57) ABSTRACT

Aspects of the disclosure relate to space model generation. A computing platform may receive space program data identifying parameters of a physical space. The computing platform may load a geometry model defining a plurality of design rules. The computing platform may generate space models for the physical space based on the space program data and the geometry model. Based on the geometry model, the computing platform may produce a score for each space model. Based on the scores, the computing platform may produce a ranked list of space models. The computing platform may generate user interface data comprising the ranked list of space models. The computing platform may send the user interface data comprising the ranked list of space models, which may cause a user computing device to display a user interface including a portion of the ranked list of space models.

18 Claims, 22 Drawing Sheets

(51) Int. Cl.
    *G06N 3/00*     (2006.01)
    *G06F 16/2457*  (2019.01)
    *G06F 30/12*    (2020.01)
    *G06F 111/20*   (2020.01)

(52) U.S. Cl.
    CPC .............. *G06F 30/13* (2020.01); *G06F 30/27*
        (2020.01); *G06K 9/623* (2013.01); *G06N*
        *3/008* (2013.01); *G06N 20/00* (2019.01);
        *G06F 2111/20* (2020.01)

(58) Field of Classification Search
    CPC . G06F 2111/20; G06F 2111/02; G06K 9/623;
                                G06N 3/008; G06N 20/00
    USPC ............................................................ 703/1
    See application file for complete search history.

(56)              References Cited

OTHER PUBLICATIONS

Hu, Ruizhen et al., "Graph2Plan: Learning Floorplan Generation from Layout Graphs", Jul. 2020, ACM Trans. Graph, vol. 39, No. 4, Article 118. (Year: 2020).*

Ruizhen Hu et al. "Graph2Plan: Learning Floorplan Generation from Layout Graphs" Arxiv.org, Cornell University Library, 201 Olin Library Cornell University Ithaca, NY 14853, XP081653991, Apr. 28, 2020, pp. 1-14.

Wenming Wu et al. "Data-driven interior plan generation for residential buildings" ACM Transactions on Graphics, ACM, NY, US, vol. 38, No. 6, XP058445798, Nov. 8, 2019, pp. 1-12.

Jain Mahak et al. "A Framework for the Conversion of Textual BigData into 2D Architectural Floor Plan" 2019 IEEE Fifth International Conference on Multimedia Big Data, IEEE, XP033644193, Sep. 11, 2019, pp. 404-410.

Paass G Ed—Institute of Electrical and Electronics Engineers: "Layout Design Using Neural Networks and Markov Random Fields" Proceedings of the International Joint Conference on Neural Networks, Nagoya, vol. 1 of 3, XP000499253, Oct. 25-29, 1993, pp. 782-785.

Oct. 10, 2021—(WO) International Search Report and Written Opinion—App No. PCT/US2021/037931.

* cited by examiner

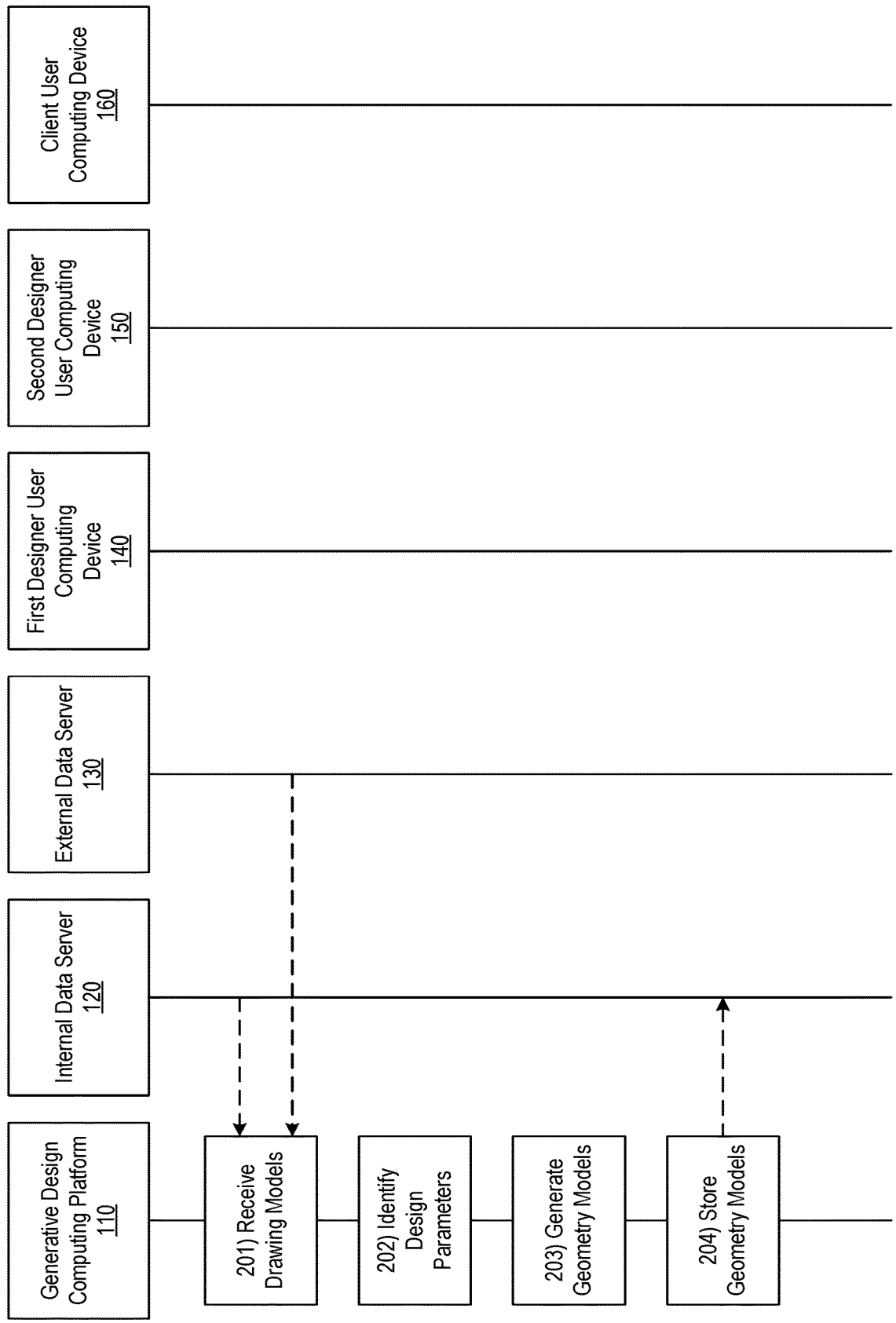

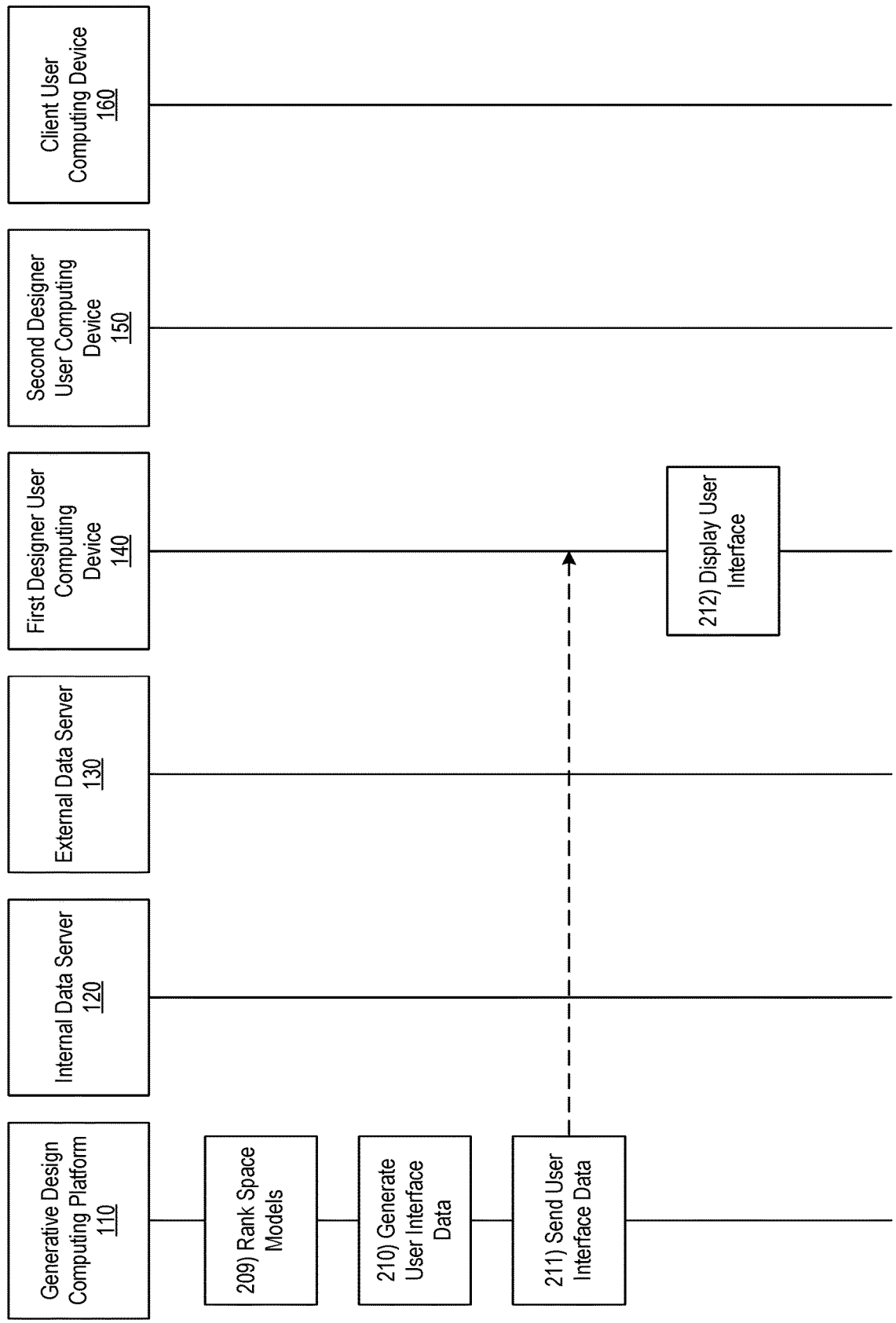

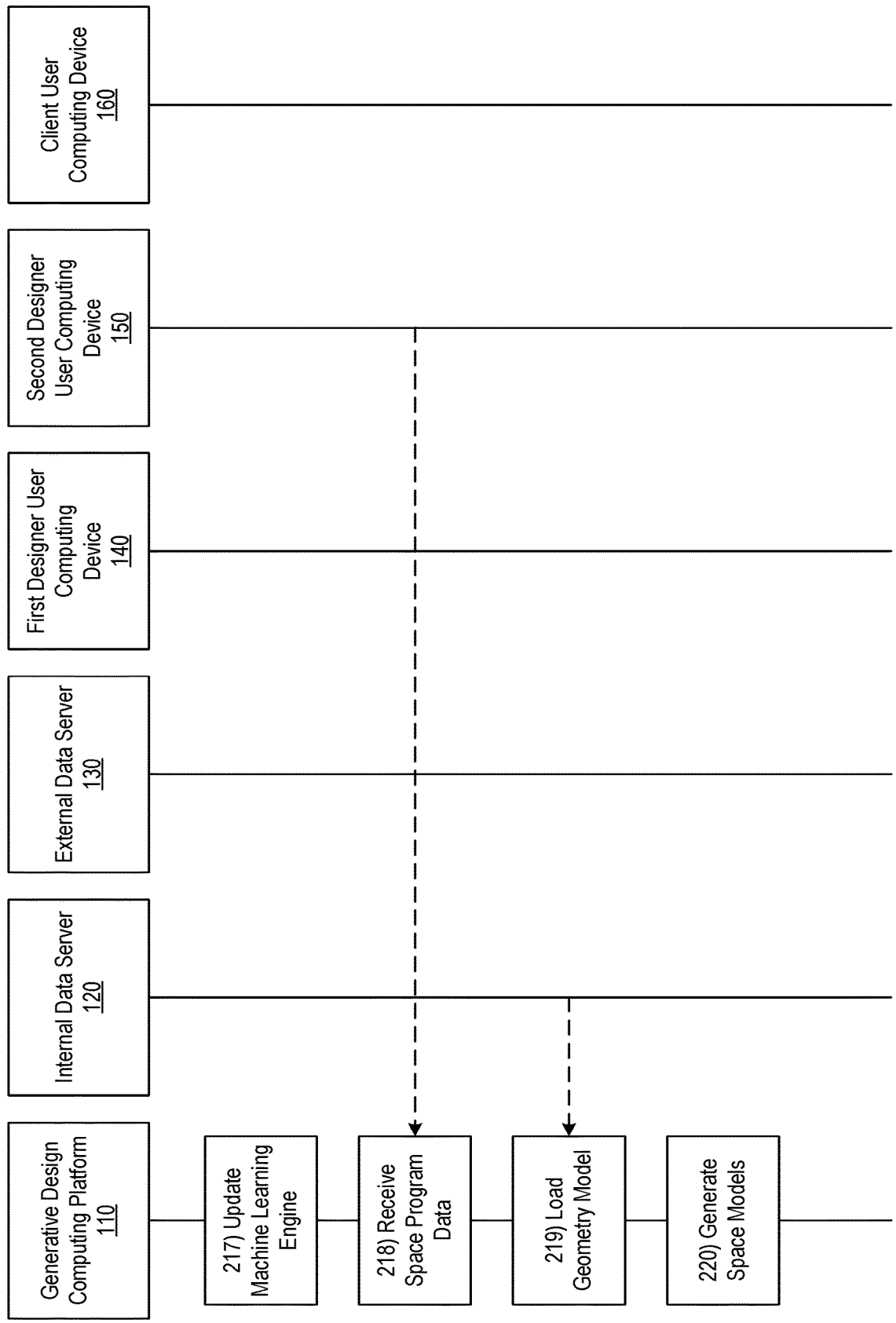

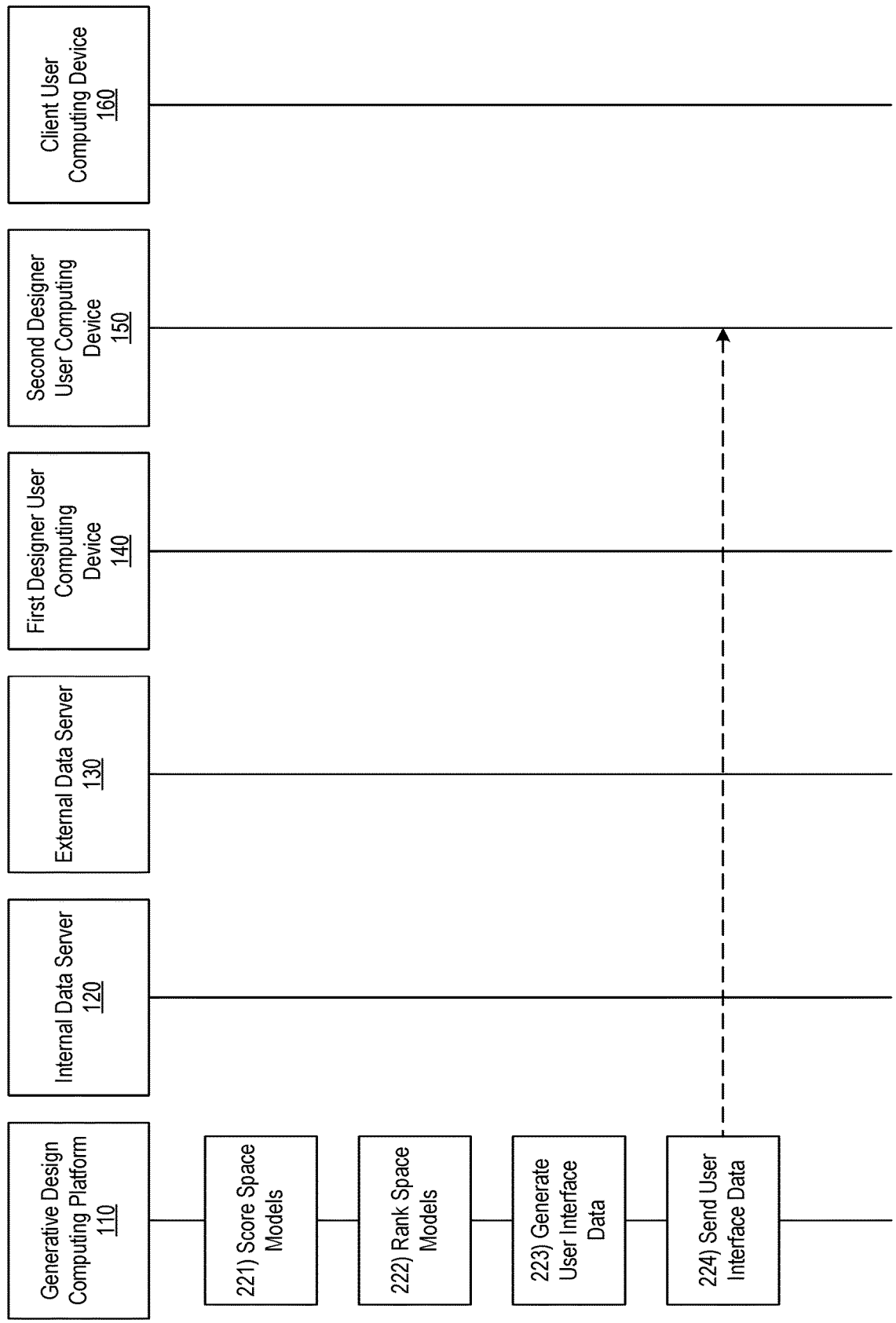

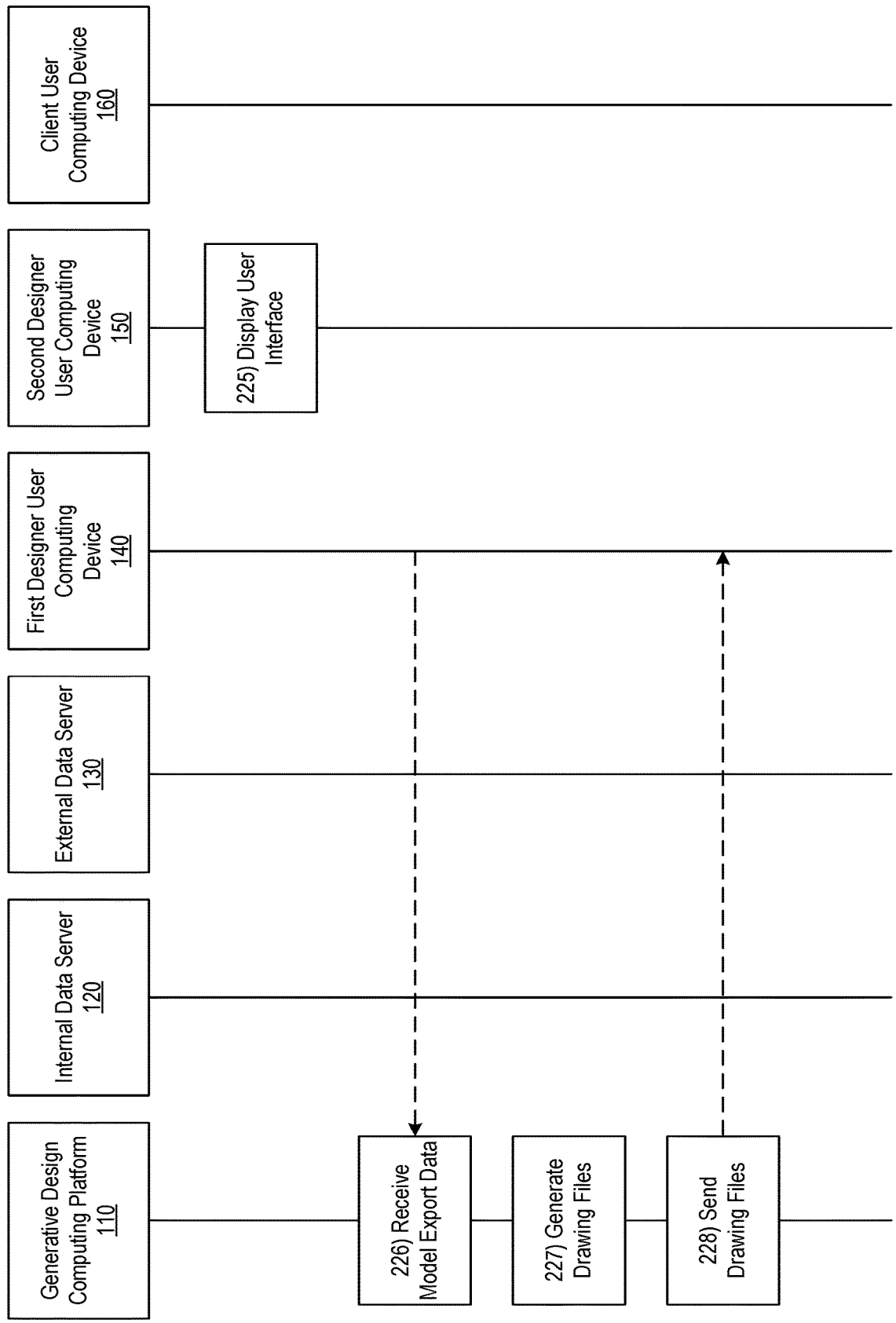

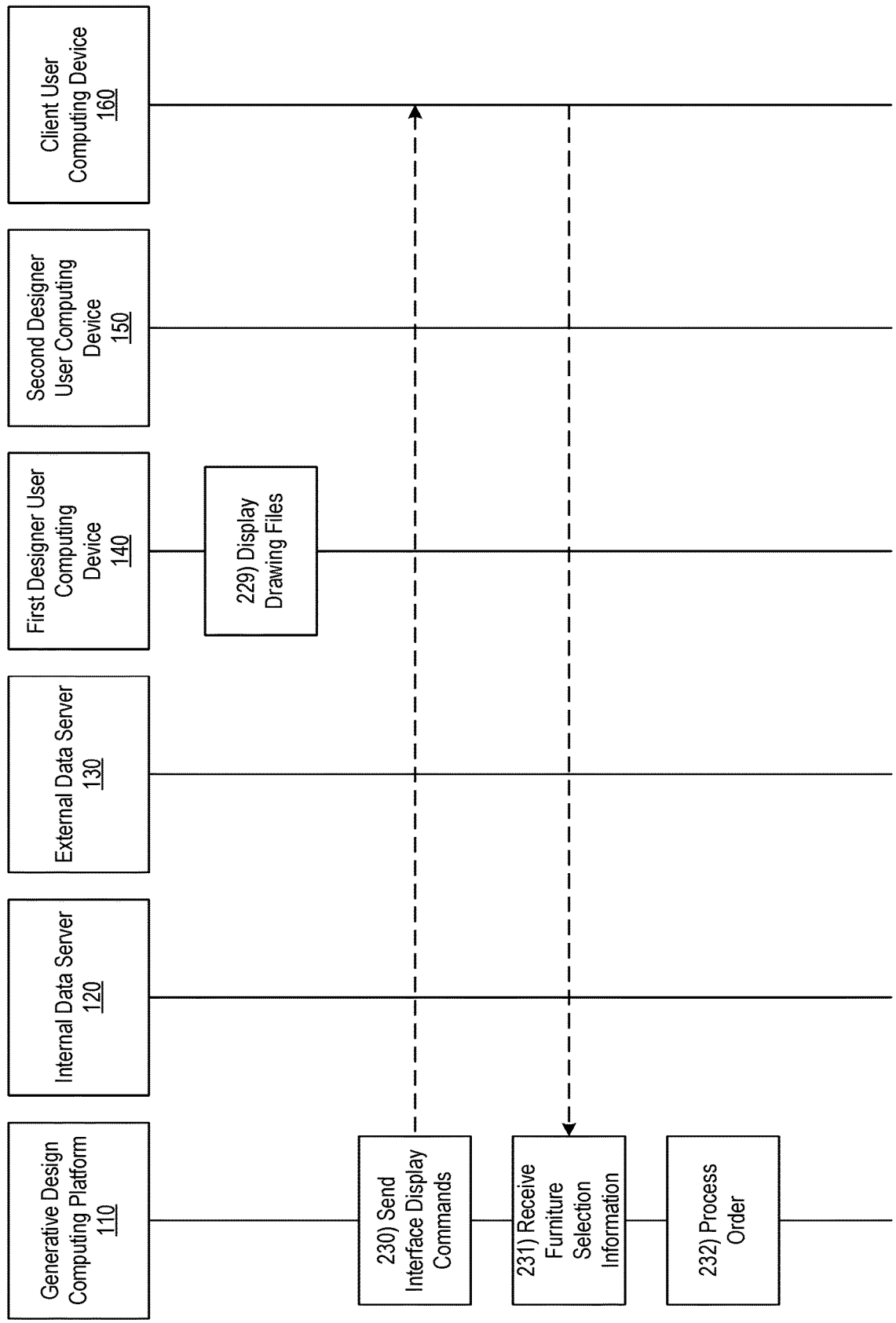

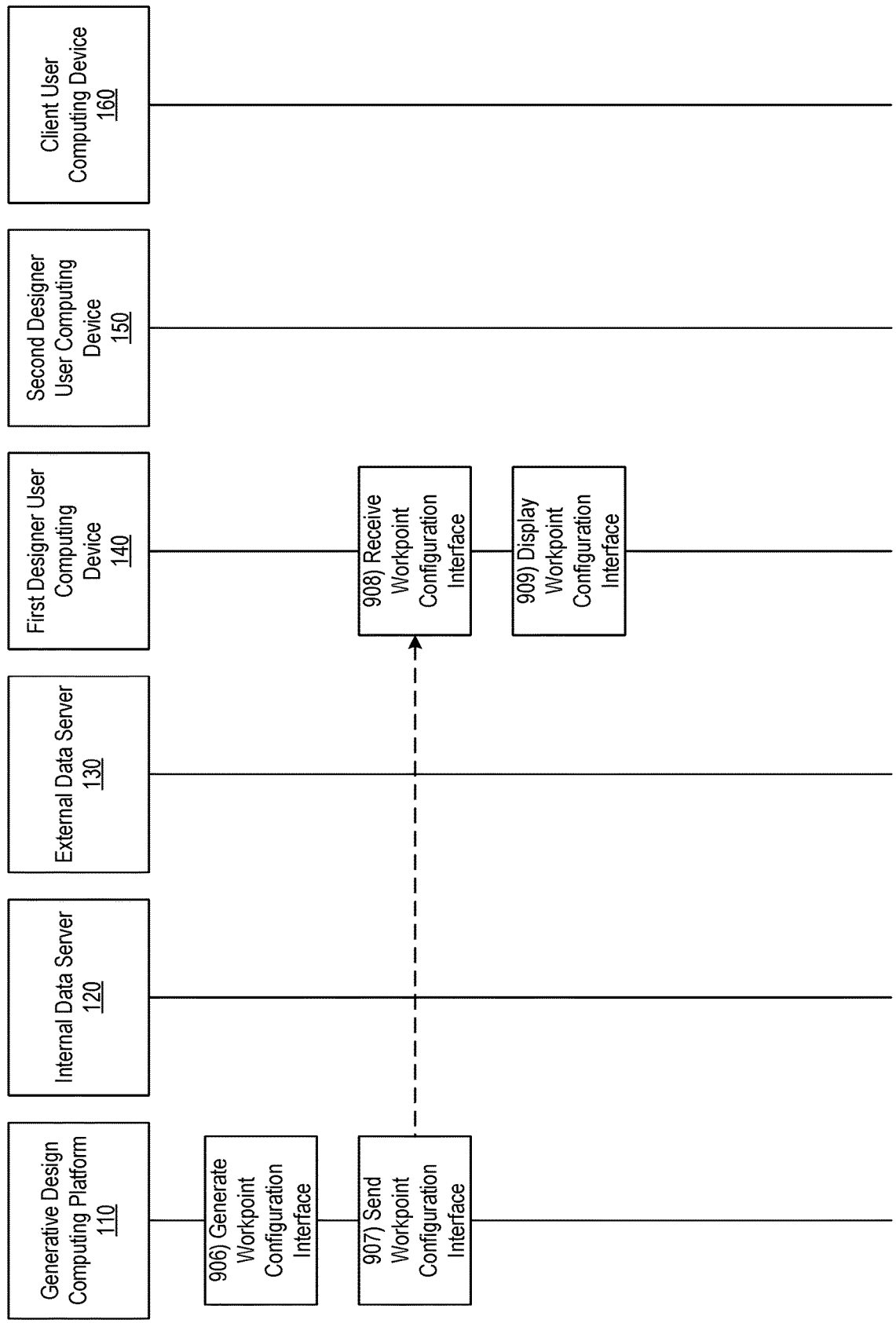

GENERATING SPACE MODELS AND GEOMETRY MODELS USING A MACHINE LEARNING SYSTEM WITH MULTI-PLATFORM INTERFACES

CROSS-REFERENCE TO RELATED APPLICATIONS

This application claims the benefit of and priority to U.S. Provisional Patent Application No. 63/041,535, filed Jun. 19, 2020, and entitled "Generating Space Models and Geometry Models Using a Machine Learning System with Multi-Platform Interfaces." Each of the foregoing application(s) is incorporated by reference herein in its entirety.

TECHNICAL FIELD

Aspects of the disclosure relate to digital data processing systems, data processing methods, and machine learning systems. In particular, one or more aspects of the disclosure relate to digital data processing systems which generate space models and geometry models using machine learning components and which include multi-platform interfaces to enable interoperability.

BACKGROUND

In some cases, office floorplans and other space models or configurations may be created, updated, and/or otherwise modified as new spaces are created, changes in occupancy happen, and/or changes in tastes or other preferences occur. In many instances, creating, updating, and/or otherwise modifying a space configuration may require a manual and labor-intensive process which includes selecting design details from a plethora of design options. While there have been attempts to automate this labor-intensive process using computer systems to generate floor plans automatically, these conventional systems have largely failed to produce usable results because, among other reasons, there are a large number of variables to be considered simultaneously when creating a workable space configuration, and there are many different ways to document a floorplan or layout, each of which might be desired and/or needed in a given instance. These conventional systems also have implemented inefficient software and hardware, resulting in delayed processing time, increased processing load, and other technical challenges.

SUMMARY

Aspects of the disclosure provide technical solutions that overcome one or more of the technical problems described above and/or other technical challenges. For instance, one or more aspects of the disclosure relate to using machine learning techniques in combination with generative design algorithms to create and output space models and provide other functionality.

In accordance with one or more embodiments, a computing platform having at least one processor, a communication interface, and memory may receive, via the communication interface, from a first user computing device, first space program data identifying one or more parameters of a first physical space. The computing platform may load a first geometry model from a database storing one or more geometry models, which may include information defining a first plurality of design rules. The computing platform may generate a first plurality of space models for the first physical space based on the first space program data identifying the one or more parameters of the first physical space and the first geometry model. Based on the first geometry model, the computing platform may score the first plurality of space models generated for the first physical space, which may produce a score for each space model of the first plurality of space models. The computing platform may rank the first plurality of space models generated for the first physical space based on the score for each space model of the first plurality of space models, which may produce a ranked list of space models. The computing platform may generate user interface data comprising the ranked list of space models. The computing platform may send, via the communication interface, to the first user computing device, the user interface data comprising the ranked list of space models, which may cause the first user computing device to display a user interface comprising at least a portion of the ranked list of space models.

In some embodiments, the computing platform may receive the first space program data identifying the one or more parameters of the first physical space by receiving information identifying architectural details of the first physical space, organization details for the first physical space, work style details for the first physical space, and budget details for the first physical space. In some embodiments, the computing platform may load the first geometry model from the database storing the one or more geometry models by selecting the first geometry model from a plurality of geometry models generated by the computing platform using a machine learning engine trained on one or more best-in-class space designs.

In some embodiments, the computing platform may load the first geometry model from the database storing the one or more geometry models by selecting the first geometry model based on the first space program data identifying the one or more parameters of the first physical space. In some embodiments, the computing platform may generate the first plurality of space models for the first physical space based on the first space program data identifying the one or more parameters of the first physical space and the first geometry model by: 1) generating a plurality of block models for the first physical space; 2) scoring the plurality of block models generated for the first physical space based on the first geometry model, which may produce a score for each block model of the plurality of block models; 3) selecting a subset of the plurality of block models based on the score for each block model of the plurality of block models; 4) generating a plurality of settings models for the first physical space, which may each correspond to a particular block model of the subset of the plurality of block models; 5) scoring the plurality of settings models generated for the first physical space based on the first geometry model, which may produce a score for each settings model of the plurality of settings models; 6) selecting a subset of the plurality of settings models based on the score for each settings model of the plurality of settings models; 7) generating a plurality of furniture models for the first physical space, where each furniture model of the plurality of furniture models corresponds to a particular settings model of the subset of the plurality of settings models; 8) scoring the plurality of furniture models generated for the first physical space based on the first geometry model, which may produce a score for each furniture model of the plurality of furniture models; and 9) selecting a subset of the plurality of furniture models based on the score for each furniture model of the plurality of furniture models, where the subset of the plurality of furniture models corresponds to the first plurality of space models generated for the first physical space.

In some embodiments, each block model of the plurality of block models may indicate potential locations of different neighborhoods in the first physical space, each settings model of the plurality of settings models may indicate potential locations of different work settings in the first physical space, and each furniture model of the plurality of furniture models may indicate potential locations of different furniture items in the first physical space. In some embodiments, the score for each space model of the first plurality of space models may indicate a level of compliance with one or more metrics defined by the first geometry model.

In some embodiments, sending the user interface data comprising the ranked list of space models to the first user computing device may cause the first user computing device to display one or more of the scores determined for each space model of the first plurality of space models. In some embodiments, the computing platform may receive, via the communication interface, from the first user computing device, data indicating a selection of a first space model from the ranked list of space models. In response to receiving the data indicating the selection of the first space model from the ranked list of space models, the computing platform may generate a visual rendering of the first space model. The computing platform may send, via the communication interface and to the first user computing device, the visual rendering of the first space model, which may cause the first user computing device to display a user interface comprising at least a portion of the visual rendering of the first space model.

In some embodiments, the computing platform may receive, via the communication interface and from the first user computing device, data indicating a user modification of the first space model. Based on receiving the data indicating the user modification of the first space model, the computing platform may update a machine learning engine executed on the computing platform.

In some embodiments, the computing platform may receive, via the communication interface and from the first user computing device, data indicating a request to export the first space model to a design tool. In response to receiving the data indicating the request to export the first space model to the design tool, the computing platform may generate one or more drawing files based on the first space model. The computing platform may send, via the communication interface, to the first user computing device, the one or more drawing files generated based on the first space model.

In some embodiments, the computing platform may receive, via the communication interface and from a second user computing device, second space program data identifying one or more parameters of a second physical space. The computing platform may load a second geometry model from the database storing the one or more geometry models, which may include information defining a second plurality of design rules. The computing platform may generate a second plurality of space models for the second physical space based on the second space program data identifying the one or more parameters of the second physical space and the second geometry model. Based on the second geometry model, the computing platform may score the second plurality of space models generated for the second physical space, which may produce a score for each space model of the second plurality of space models. The computing platform may rank the second plurality of space models generated for the second physical space based on the score for each space model of the second plurality of space models, which may produce a second ranked list of space models. The computing platform may generate second user interface data comprising the second ranked list of space models. The computing platform may send, via the communication interface and to the second user computing device, the second user interface data comprising the second ranked list of space models, which may cause the second user computing device to display a user interface comprising at least a portion of the second ranked list of space models.

In accordance with one or more additional embodiments, a computing platform having at least one processor, a communication interface, and memory may receive, via the communication interface, from a data server, a plurality of drawing models corresponding to different space designs. The computing platform may identify a plurality of design parameters associated with each drawing model of the plurality of drawing models corresponding to the different space designs. The computing platform may train a machine learning engine based on the plurality of drawing models corresponding to the different space designs and the plurality of design parameters associated with each drawing model of the plurality of drawing models corresponding to the different space designs, which may produce at least one geometry model corresponding to the plurality of drawing models. The computing platform may store, in a database storing one or more additional geometry models, the at least one geometry model corresponding to the plurality of drawing models.

In some embodiments, in receiving the plurality of drawing models corresponding to the different space designs, the computing platform may receive at least one two-dimensional computer-aided design (CAD) model or PDF drawing. In some embodiments, the computing platform may identify the plurality of design parameters associated with each drawing model of the plurality of drawing models corresponding to the different space designs by identifying a plurality of design features, which may include one or more of: a total square footage, a total number of offices, a total number of meeting spaces, a total number of community spaces, a number of seats per office, a number of seats per meeting space, a number of seats per community space, a percentage of the total square footage allocated to offices, a percentage of the total square footage allocated to meeting spaces, a percentage of the total square footage allocated to community space, an average office size, or an average meeting space size.

In some embodiments, the computing platform may identify the plurality of design parameters associated with each drawing model of the plurality of drawing models corresponding to the different space designs by, prior to identifying the plurality of design parameters, selecting the plurality of design features by applying cognitive machine learning based on an organization corresponding to each drawing model of the plurality of drawing models. In some embodiments, the computing platform may select the plurality of design features by selecting the plurality of design features based on one or more of: an industry, geographic data, a size, or a personality of the organization.

In some embodiments, the computing platform may select the plurality of design features by selecting the plurality of design features based on a user input, and the plurality of design features may be consistent for each drawing model of the plurality of drawing models. In some embodiments, the computing platform may produce the at least one geometry model by identifying one or more design rules that are applicable to score compliance of at least one space model with the plurality of drawing models, where the one or more design rules include one or more of data ranges or numerical constraints.

In some embodiments, the computing platform may receive, via the communication interface and from a user computing device, space program data identifying one or more parameters of a physical space. The computing platform may load the at least one geometry model from the database storing the one or more additional geometry models. The computing platform may generate a plurality of space models for the physical space based on the space program data identifying the one or more parameters of the physical space and the at least one geometry model. The computing platform may score, based on the at least one geometry model, the plurality of space models generated for the physical space, which may produce a score for each space model of the plurality of space models. The computing platform then may rank the plurality of space models generated for the physical space based on the score for each space model of the plurality of space models, which may produce a ranked list of space models. The computing platform may generate user interface data comprising the ranked list of space models. Then, the computing platform may send, via the communication interface and to the user computing device, the user interface data comprising the ranked list of space models, which may cause the user computing device to display a user interface comprising at least a portion of the ranked list of space models.

In some embodiments, the computing platform may generate the plurality of space models for the physical space based on the space program data identifying the one or more parameters of the physical space and the at least one geometry model by: 1) generating a plurality of block models for the physical space; 2) scoring the plurality of block models generated for the physical space based on the at least one geometry model, which may produce a score for each block model of the plurality of block models; 3) selecting a subset of the plurality of block models based on the score for each block model of the plurality of block models; 4) generating a plurality of settings models for the physical space, where each settings model of the plurality of settings models corresponds to a particular block model of the subset of the plurality of block models; 5) scoring the plurality of settings models generated for the physical space based on the at least one geometry model, which may produce a score for each settings model of the plurality of settings models; 6) selecting a subset of the plurality of settings models based on the score for each settings model of the plurality of settings models; 7) generating a plurality of furniture models for the physical space, where each furniture model of the plurality of furniture models corresponds to a particular settings model of the subset of the plurality of settings models; 8) scoring the plurality of furniture models generated for the physical space based on the at least one geometry model, which may produce a score for each furniture model of the plurality of furniture models; and 9) selecting a subset of the plurality of furniture models based on the score for each furniture model of the plurality of furniture models, where the subset of the plurality of furniture models corresponds to the plurality of space models generated for the physical space.

In some embodiments, each block model of the plurality of block models may indicate potential locations of different neighborhoods in the physical space, each settings model of the plurality of settings models may indicate potential locations of different work settings in the physical space, and each furniture model of the plurality of furniture models may indicate potential locations of different furniture items in the physical space.

In accordance with one or more additional embodiments, a computing platform having at least one processor, a communication interface, and memory may receive, via the communication interface and from a first computing device, data indicating a request to export a space model to a first design tool, and the space model may be defined in a plurality of data formats. In response to receiving the data indicating the request to export the space model to the first design tool, the computing platform may generate one or more first drawing files based on the space model by: 1) selecting, based on the first design tool, a first data format of the plurality of data formats, 2) extracting first format-specific data from the space model, where the first format-specific data is defined in the first data format, and 3) generating the one or more first drawing files using the first format-specific data extracted from the space model, where the one or more first drawing files are generated according to the first data format. The computing platform may send, via the communication interface and to the first computing device, the one or more first drawing files generated based on the space model.

In some embodiments, the computing platform may receive, from the first computing device, user input defining space information corresponding to one or more elements, or the computing platform may automatically generate space information corresponding to one or more elements using cognitive machine learning based on best-in-class floor plans. In some embodiments, prior to receiving the data indicating the request to export the space model to the first design tool, the computing platform may generate the space model based on the space information corresponding to the one or more elements.

In some embodiments, the one or more elements may be one of more of: blocks, settings, or furniture items, where the blocks may be office departments, the settings may be room types, and the furniture items may be individual pieces of furniture. In some embodiments, the computing platform may send one or more commands directing a client computing device to display a graphical user interface that includes a selectable furniture-purchase element, which may cause the client computing device to display the graphical user interface that includes the selectable furniture-purchase element. Subsequently, the computing platform may receive furniture selection information indicating an order for one or more of the furniture items. The computing platform then may process the order for the one or more of the furniture items.

In some instances, the plurality of data formats may include one or more of: computer-aided design (CAD), CET, Revit, or SketchUp. In some instances, the computing platform may receive, via the communication interface and from a second computing device, data indicating a request to export the space model to a second design tool. In response to receiving the data indicating the request to export the space model to the second design tool, the computing platform may generate one or more second drawing files based on the space model by: 1) selecting, based on the second design tool, a second data format of the plurality of data formats, 2) extracting second format-specific data from the space model, where the second format-specific data is defined in the second data format, and 3) generating the one or more second drawing files using the second format-specific data from the space model, where the one or more second drawing files are generated according to the second data format. The computing platform may send, via the communication interface and to the second computing device, the one or more second drawing files generated based on the space model.

In some embodiments, the computing platform may generate the space model by: 1) receiving, via the communication interface and from the first computing device, space program data identifying one or more parameters of a physical space; 2) loading a geometry model from a database storing one or more geometry models, where the geometry model contains information defining a plurality of design rules; 3) generating a plurality of block models for the physical space; 4) scoring the plurality of block models generated for the physical space based on the geometry model, which may produce a score for each block model of the plurality of block models; 5) selecting a subset of the plurality of block models based on the score for each block model of the plurality of block models; 6) generating a plurality of settings models for the physical space, where each settings model of the plurality of settings models corresponds to a particular block model of the subset of the plurality of block models; 7) scoring the plurality of settings models generated for the physical space based on the geometry model, which may produce a score for each settings model of the plurality of settings models; 8) selecting a subset of the plurality of settings models based on the score for each settings model of the plurality of settings models; 9) generating a plurality of furniture models for the physical space, where each furniture model of the plurality of furniture models corresponds to a particular settings model of the subset of the plurality of settings models; 10) scoring the plurality of furniture models generated for the physical space based on the geometry model, which may produce a score for each furniture model of the plurality of furniture models; and 11) selecting a subset of the plurality of furniture models based on the score for each furniture model of the plurality of furniture models, where the subset of the plurality of furniture models includes the space model.

In some embodiments, each block model of the plurality of block models may indicate potential locations of different neighborhoods in the physical space, each settings model of the plurality of settings models may indicate potential locations of different work settings in the physical space, and each furniture model of the plurality of furniture models may indicate potential locations of different furniture items in the physical space. In some embodiments, generating the space model may include generating the space model in each of the plurality of data formats.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for generating space models and geometry models using a machine learning system with multi-platform interfaces in accordance with one or more example embodiments;

FIGS. 3-6 depict illustrative user interfaces for generating space models and geometry models using a machine learning system with multi-platform interfaces in accordance with one or more example embodiments;

FIGS. 9A-9B depict an illustrative event sequence for providing workplace configuration interfaces in accordance with one or more example embodiments.

DETAILED DESCRIPTION

Figure 1A:
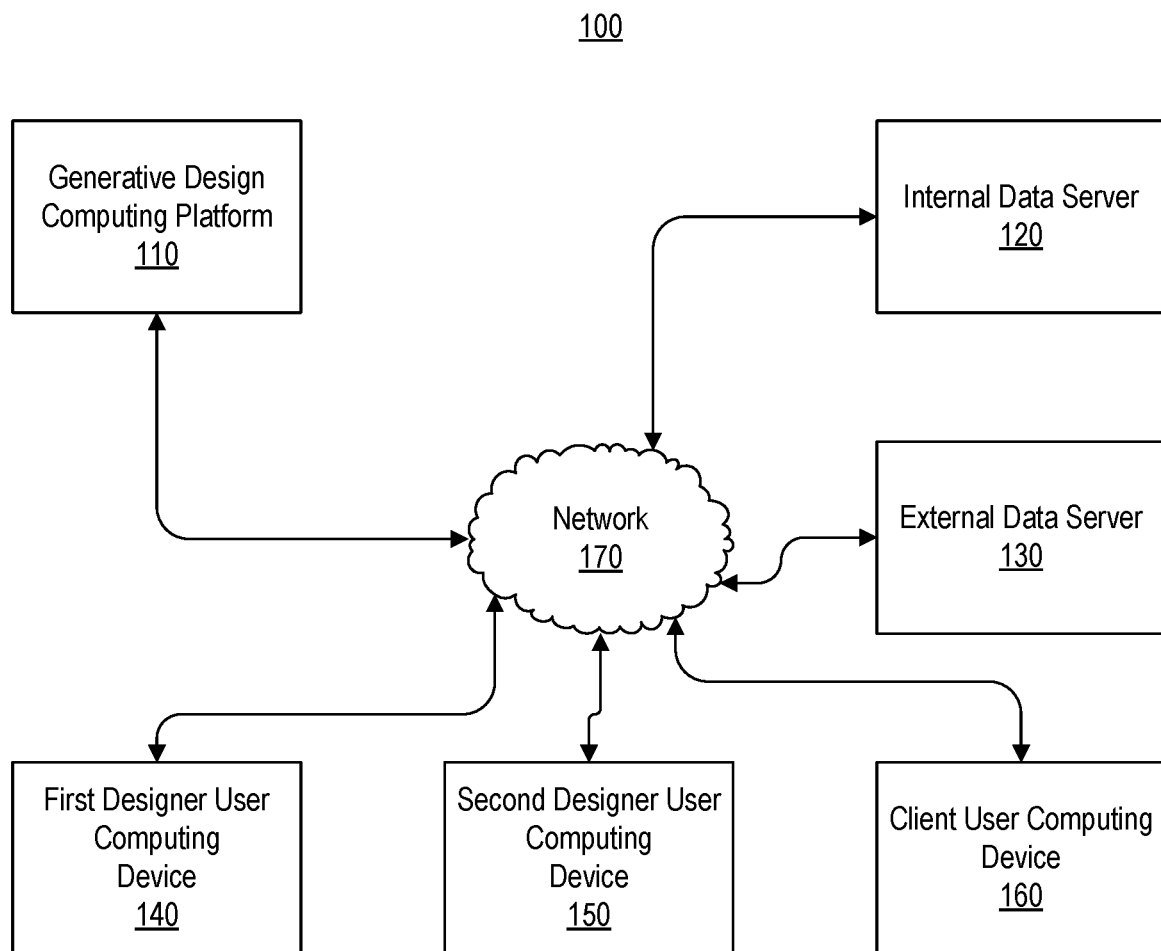
FIGS. 1A and 1B depict an illustrative operating environment for generating space models and geometry models using a machine learning system with multi-platform interfaces in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to generating space models (which may, e.g., also be referred to as space plans, test-fits, and/or floor plans) and geometry models (which may, e.g., also be referred to as circulation networks or circulation paths) using a machine learning system with multi-platform interfaces. For example, a computing platform may receive space program data, which in some instances may identify one or more parameters of a physical space. The computing platform may load a geometry model from a database storing one or more geometry models. In some instances, the geometry models may define a plurality of design rules. Additionally or alternatively, the geometry model may define rules for dividing up a floor plate, placing circulation paths, and/or placing furniture settings. The computing platform may generate a plurality of space models (e.g., floor plans, test-fits, or other models that are used to document and/or otherwise specify how a space and/or its contents are configured) for the physical space based on the space program data identifying the one or more parameters of the physical space and the geometry model. Based on the geometry model, the computing platform may score the plurality of space models generated for the physical space, which may produce a score for each space model of the plurality of space models. The computing platform may rank the plurality of space models generated for the physical space based on the score for each space model of the plurality of space models, which may produce a ranked list of space models. The computing platform may generate user interface data comprising the ranked list of space models and may send, via the communication interface and to the user computing device, the user interface data comprising the ranked list of space models, which may cause the user computing device to display a user interface comprising at least a portion of the ranked list of space models.

In doing so, the computing platform may automatically generate a targeted series of space models with little, if any, user input. Furthermore, by implementing a generative design algorithm that uses a layered approach to generating the space models (which may, e.g., in some instances include generating and scoring block models (e.g., that may be used to locate departments, rooms, spaces, and/or other regions within a floor place) and settings models (e.g., that may be used to create a configuration for a room or space) in different design stages), the computing platform may reduce processing time and computational bandwidth. For example, by only solving for settings for a given physical space once blocks have been solved for, determined, and/or otherwise defined with respect to the physical space, and by only solving for furniture for the physical space once settings have been solved for, determined, and/or otherwise defined with respect to the physical space, the computing platform may generate a relatively smaller number of space models that optimize for and/or fit required parameters and/or non-required, preferred parameters than if the processing required to generate models for blocks, settings, and furniture were simultaneously performed. Accordingly, in at least some instances and by way of example, furniture might only be solved for a subset of settings, and this subset may itself be selected from a subset of blocks, rather than solving furniture for all blocks. This tiered, generative design algorithm provides multiple technical advantages, including reduced processing load and reduced consumption of network bandwidth and other computing resources. In addition, and in some arrangements that are described in greater detail below, a computing platform implementing some aspects of the disclosure may generate space models in a plurality of data formats. In instances where this multi-format approach is implemented, a computing platform might only generate output elements a single time at the outset of the modeling process, rather than at the end of the process in response to receiving a request for a space model or associated data file in an alternate format. When implemented, this multi-format approach to space model generation may provide additional technical advantages, including reduced processing load and increasing processing efficiencies, as well as enhanced interoperability.

Figure 1B:
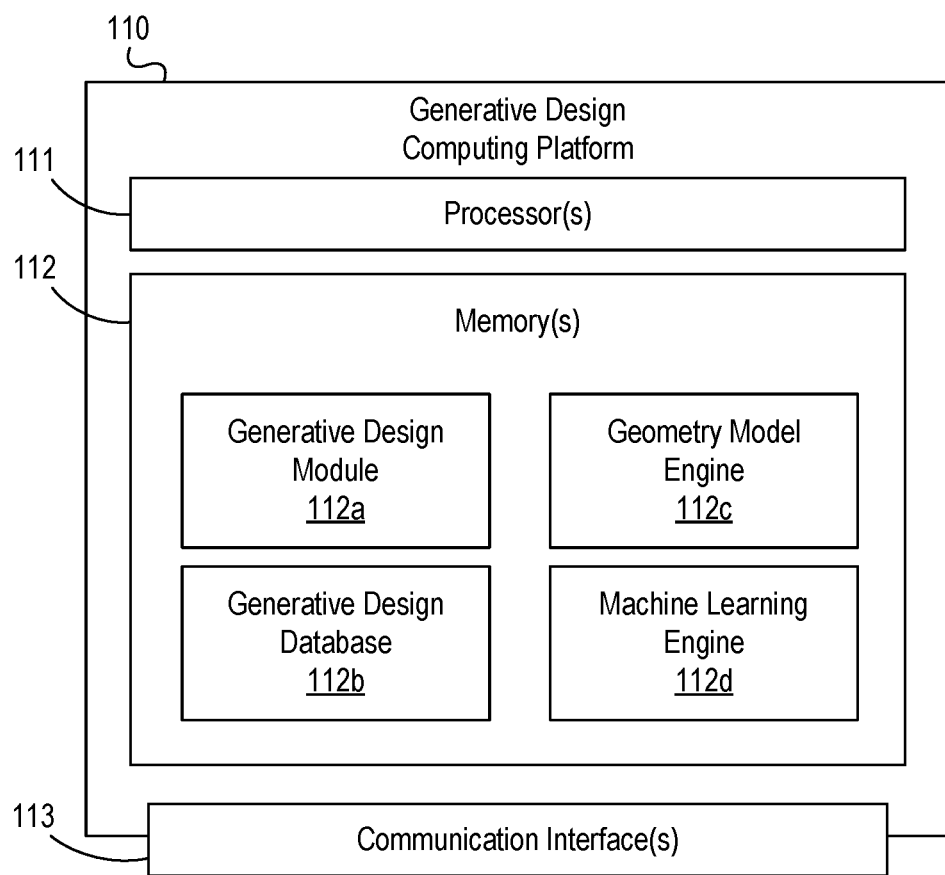

FIGS. 1A and 1B depict an illustrative operating environment for generating space models and geometry models using a machine learning system with multi-platform interfaces in accordance with one or more example embodiments. Referring to FIG. 1A, computing environment 100 may include various computer systems, computing devices, networks, and/or other operating infrastructure. For example, computing environment 100 may include a generative design computing platform 110, an internal data server 120, an external data server 130, a first designer user computing device 140, a second designer user computing device 150, a client user computing device 160, and a network 170. It should be noted that computing environment 100 is exemplary, and in some cases, a generative design computing environment may include more or fewer computer systems, computing devices, networks, and/or other operating interfaces, or may combine or distribute computing functions into fewer or more devices, and still operate according to methods and principles disclosed herein.

Network 170 may include one or more wired networks and/or one or more wireless networks that interconnect generative design computing platform 110, internal data server 120, external data server 130, first designer user computing device 140, second designer user computing device 150, client user computing device 160, and/or other computer systems and/or devices. In addition, each of generative design computing platform 110, internal data server 120, external data server 130, first designer user computing device 140, second designer user computing device 150, and client user computing device 160 may be special-purpose computing devices configured to perform specific functions, as illustrated in greater detail below, and may include specific computing components such as processors, memories, communication interfaces, and/or the like.

One or more internal data servers, such as internal data server 120, may be configured to host and/or otherwise provide internal block models, settings models, furniture models, and/or other data. For instance, the internal data server 120 may be maintained or otherwise controlled by an enterprise organization that maintains or otherwise controls generative design computing platform 110 (e.g., a furniture company, an architectural firm, a design firm). In addition, the internal data server 120 may be configured to maintain product information, best-in-class floor plans, geometry models, design rules (e.g., design principles), and/or other design data developed by, used by, and/or otherwise associated with the enterprise organization.

One or more external data servers, such as external data server 130, may be configured to host and/or otherwise provide external block models, settings models, furniture models, and/or other data. For instance, the external data server 130 may be maintained or otherwise controlled by a third-party organization (e.g., an alternative furniture company, an alternative architectural firm, an alternative design firm) different from the enterprise organization that maintains or otherwise controls generative design computing platform 110. In addition, the external data server 130 may be configured to maintain product information, best-in-class floor plans, geometry models, design rules, and/or other design data developed by, used by, and/or otherwise associated with the third-party organization.

First designer user computing device 140 may be configured to be used by a first user (who may, e.g., be an enterprise user associated with an enterprise organization operating generative design computing platform 110 such as a designer, architect, or the like). In some instances, first designer user computing device 140 may be configured to present one or more user interfaces that are generated by and/or otherwise associated with a first design tool (e.g., tools related to computer-aided design (CAD), CET, Revit, SketchUp, or the like), a local browser, and/or one or more other software applications.

Second designer user computing device 150 may be configured to be used by a second user (who may, e.g., be an enterprise user associated with an enterprise organization operating generative design computing platform 110 such as a designer, architect, or the like and who may be different from the first user of first designer user computing device 140). In some instances, second designer user computing device 150 may be configured to present one or more user interfaces that are generated by and/or otherwise associated with a second design tool (e.g., tools related to computer-aided design (CAD), CET, Revit, SketchUp, or the like) different from the first design tool, a local browser, and/or one or more other software applications.

Client user computing device 160 may be configured to be used by a third user (who may, e.g., be a client or customer of an enterprise organization operating generative design computing platform 110 and who may be different from the first user of first designer user computing device 140 and the second user of second designer user computing device 150). In some instances, client user computing device 160 may be configured to present one or more user interfaces associated with a local browser that may receive information from, send information to, and/or otherwise exchange information with generative design computing platform 110 during a browser session. For example, client user computing device 160 may be configured to present one or more furniture purchasing interfaces, floor plan viewing interfaces, design viewing interfaces, and/or other user interfaces associated with one or more space models generated by generative design computing platform 110 and/or other information received from generative design computing platform 110.

Referring to FIG. 1B, generative design computing platform 110 may include one or more processor(s) 111, one or more memory(s) 112, and one or more communication interface(s) 113. In some instances, generative design computing platform 110 may be made up of a plurality of different computing devices, which may be distributed within a single data center or a plurality of different data centers. In these instances, the one or more processor(s) 111, one or more memory(s) 112, and one or more communication interface(s) 113 included in generative design computing platform 110 may be part of and/or otherwise associated with the different computing devices that form generative design computing platform 110.

In one or more arrangements, processor(s) 111 may control operations of generative design computing platform 110. Memory(s) 112 may store instructions that, when executed by processor(s) 111, cause generative design computing platform 110 to perform one or more of the functions described herein. Communication interface(s) 113 may include one or more wired and/or wireless network interfaces, and communication interface(s) 113 may connect generative design computing platform 110 to one or more networks (e.g., network 170) and/or enable generative design computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause generative design computing platform 110 to perform various functions), databases (which may, e.g., store data used by generative design computing platform 110 in performing various functions), and/or other elements (which may, e.g., include processing engines, services, and/or other elements). For example, memory(s) 112 may store and/or otherwise provide a generative design module 112a, a generative design database 112b, a geometry model engine 112c, and a machine learning engine 112d. In some instances, generative design module 112a may store instructions that cause generative design computing platform 110 to generate space models and/or execute one or more other functions described herein. Additionally, generative design database 112b may store data that is used by generative design computing platform 110 in generating space models and/or executing one or more other functions described herein. Geometry model engine 112c may be used to generate and/or store geometry models that may be used by generative design module 112a and/or generative design computing platform 110 in space model generation and ranking. Machine learning engine 112d may have instructions that direct and/or cause the generative design computing platform 110 to set, define, and/or iteratively refine optimization rules and/or other parameters used by the generative design computing platform 110 and/or the other systems in computing environment 100.

Figure 1C:
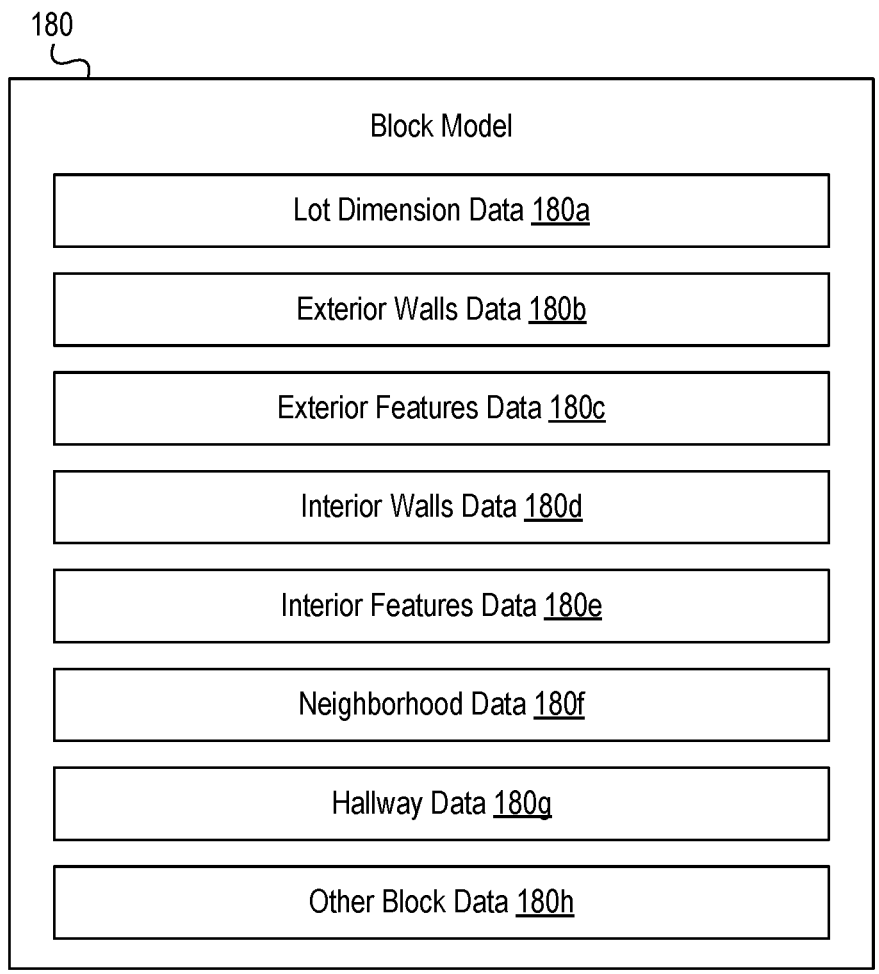
FIGS. 1C, 1D, 1E, 1F, and 1G depict illustrative data structures for various models that may be generated, stored, and/or otherwise used in accordance with one or more example embodiments.

FIGS. 1C, 1D, 1E, 1F, and 1G depict illustrative data structures for various models that may be generated, stored, and/or otherwise used in accordance with one or more example embodiments. Referring to FIG. 1C, an example block model 180 is depicted. Block model 180 may, for instance, include lot dimension data 180a, exterior walls data 180b, exterior features data 180c, interior walls data 180d, interior features data 180e, neighborhood data 180f (which may e.g., include department information, team information, group information, and/or other information), hallway data 180g (which may, e.g., include circulation data regarding hallways, aisles, corridors, stairs, elevators, and/or other areas used to access spaces in a building), and other block data 180h. Lot dimension data 180a may, for instance, include information defining one or more dimensions and/or other features of a lot or other parcel of land where one or more buildings and/or other structures may be located. Exterior walls data 180b may include information defining the locations of and/or other features of one or more exterior walls of such buildings and/or other structures, and exterior features data 180c may include information defining other exterior features (e.g., windows, landscaping, exterior columns, decorations, etc.) of such buildings and/or other structures. Interior walls data 180d may include information defining the locations of and/or other features of one or more interior walls within such buildings and/or other structures, and interior features data 180e may include information defining other interior features (e.g., windows, heating-ventilation-air-conditioning (HVAC) systems and elements, interior columns, restrooms, vertical circulation, mechanical/electrical rooms, closets, etc.). In some instances, these interior and/or exterior walls may be two or three dimensional walls that may be dragged, dropped, and/or otherwise modified (e.g., materials may be changed, and/or other modifications may be performed). Neighborhood data 180f may include information defining the locations of various organization departments, office neighborhoods, and/or other groupings within a physical space. Hallway data 180g may include information defining the locations of various hallways, walkways, and/or other boundaries in a physical space, and other block data 180h may include information defining other features of specific areas of the physical space. In some instances, and as illustrated in greater detail below, some aspects of a block model may be defined based on input received by generative design computing platform 110, such as dimensions and/or exterior features of a lot of land or a building located on such a lot, while other aspects of a block model may be determined by generative design computing platform 110 using one or more processes described herein, such as the positioning and layout of various neighborhoods, hallways, and/or other block model features.

Figure 1D:
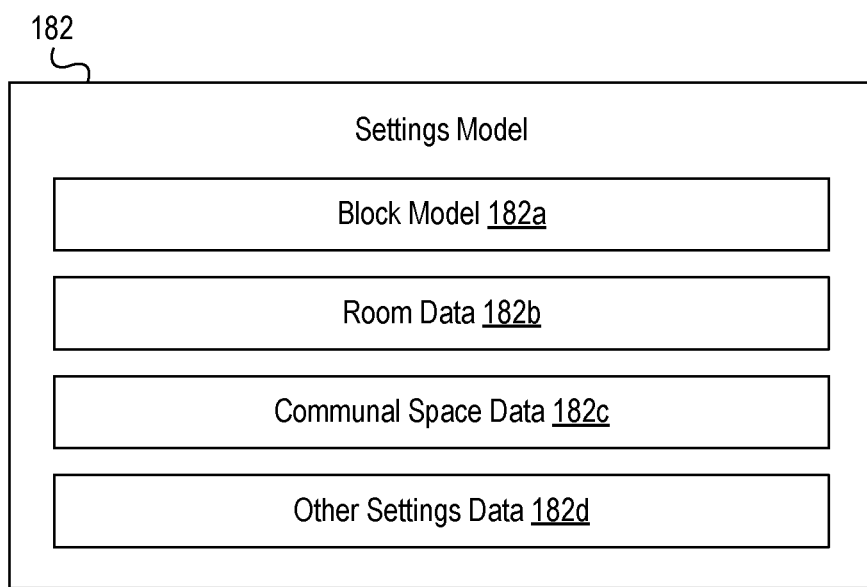

Referring to FIG. 1D, an example settings model 182 is depicted. Settings model 182 may, for instance, include a block model 182a, room data 182b, common (shared) space data 182c, and other settings data 182d. Block model 182a may include a block model that has been generated and/or stored for a particular physical space (e.g., the same space to which the settings model 182 applies). For instance, block model 182 may include block model 180 and/or any of its content data. Room data 182b may include information defining the locations of and/or other features of various rooms (e.g., private offices, meeting rooms, etc.) in a physical space. Common (shared) space data 182c may include information defining the locations of and/or other features of various common (shared) spaces (e.g., cafes, reception areas, libraries, outdoor patios, indoor gardens, etc.) in a physical space. Other settings data 182*d* may include information defining other features of specific settings within the physical space. In some instances, and as illustrated in greater detail below, some aspects of a settings model may be determined by generative design computing platform 110 using one or more processes described herein, such as the positioning and layout of various rooms, common (shared) spaces, and/or other settings model features.

Figure 1E:
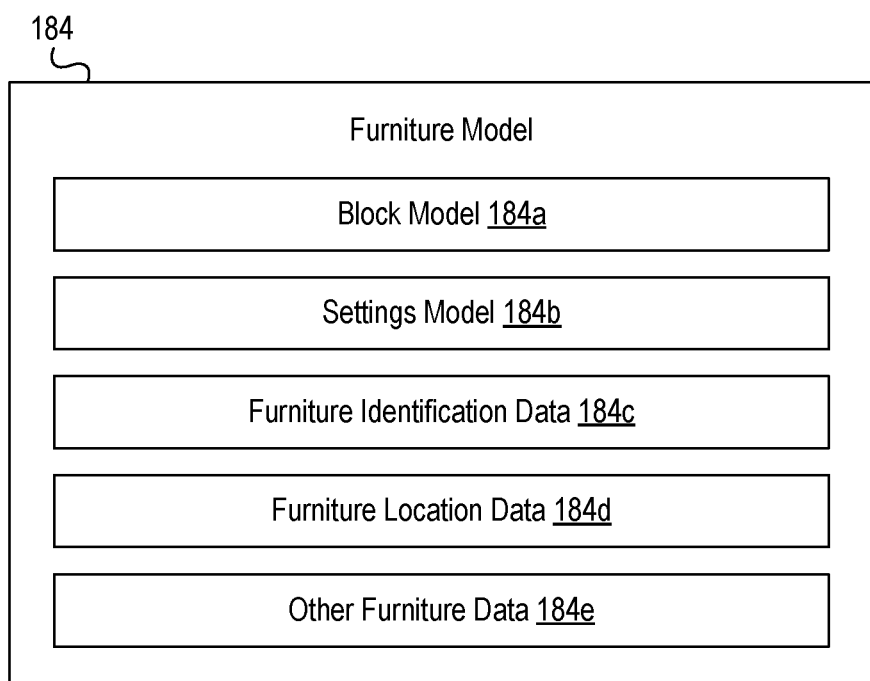

Referring to FIG. 1E, an example furniture model 184 is depicted. Furniture model 184 may, for instance, include a block model 184*a*, a settings model 184*b*, furniture identification data 184*c*, furniture location data 184*d*, and other furniture data 184*e*. Block model 184*a* may include a block model that has been generated and/or stored for a particular physical space (e.g., the same space to which the furniture model 184 applies). For instance, block model 184*a* may include block model 180 and/or any of its content data. Settings model 184*b* may include a settings model that has been generated and/or stored for a particular physical space (e.g., the same space to which the furniture model 184 applies). For instance, settings model 184*b* may include settings model 182 and/or any of its content data. Furniture identification data 184*c* may include information defining one or more specific pieces of furniture (e.g., desks, chairs, etc.) for a physical space, such as one or more stock keeping units (SKUs) corresponding to such pieces of furniture, names and/or other identifiers corresponding to such pieces of furniture, color details and/or other specifications for such pieces of furniture, and/or other identifying information. Furniture location data 184*d* may include information defining the locations of one or more specific pieces of furniture within a physical space, such as identifiers indicating positioning of desks, chairs, and/or other furniture components at specific work points, coordinates indicating positioning of each piece of furniture within the physical space, and/or other location information. Other furniture data 184*e* may include information defining other features of furniture within the physical space. In some instances, and as illustrated in greater detail below, some aspects of a furniture model may be determined by generative design computing platform 110 using one or more processes described herein, such as the inclusion of and positioning of specific pieces of furniture at specific work points within a physical space.

Figure 1F:
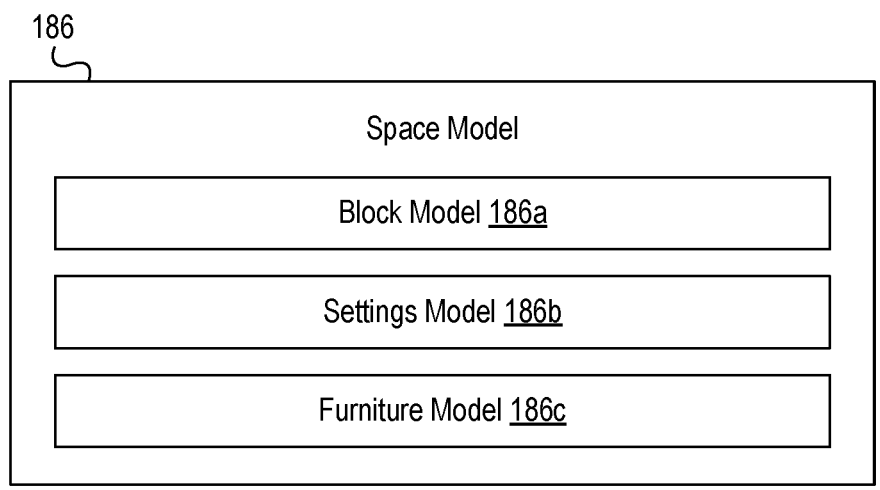

Referring to FIG. 1F, an example space model 186 is depicted. Space model 186 may, for instance, include a block model 186*a*, a settings model 186*b*, and a furniture model 186*c*. Block model 186*a* may include a block model that has been generated and/or stored for a particular physical space (e.g., the same space to which the space model 186 applies). For instance, block model 186*a* may include block model 180 and/or any of its content data. Settings model 186*b* may include a settings model that has been generated and/or stored for a particular physical space (e.g., the same space to which the space model 186 applies). For instance, settings model 186*b* may include settings model 182 and/or any of its content data. Furniture model 186*c* may include a furniture model that has been generated and/or stored for a particular physical space (e.g., the same space to which the space model 186 applies). For instance, furniture model 186*c* may include furniture model 184 and/or any of its content data. In some instances, and as illustrated in greater detail below, some aspects of a space model may be determined by generative design computing platform 110 using one or more processes described herein, such as by iteratively generating and optimizing block models, settings models, and/or furniture models for a specific physical space.

Figure 1G:
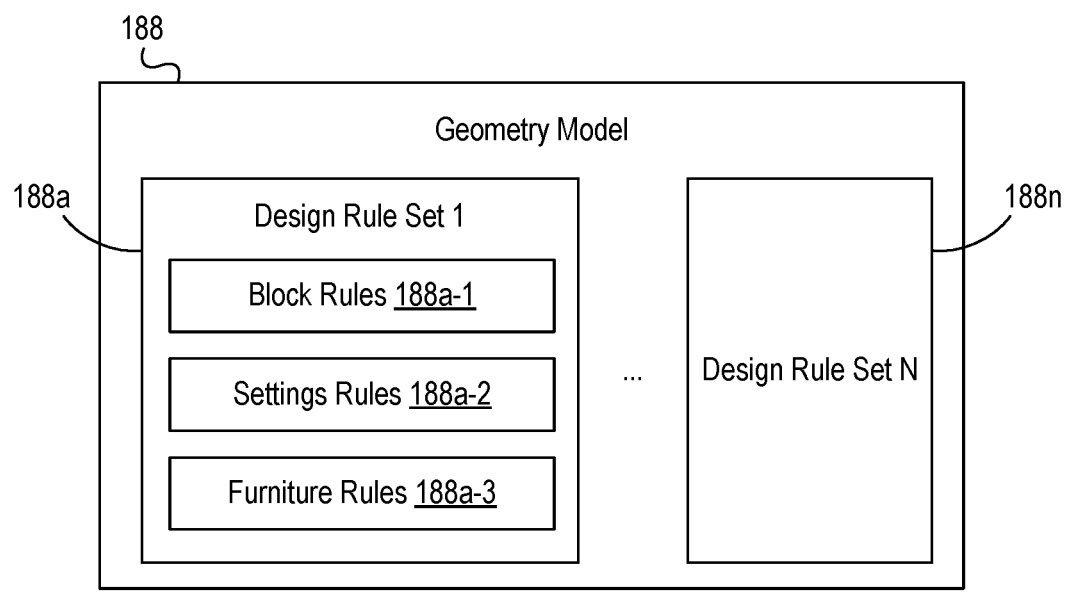

Referring to FIG. 1G, an example geometry model 188 is depicted. Geometry model 188 may, for instance, include one or more design rule sets, such as design rule set 188*a* and design rule set 188*n*. Each design rule set may, for instance, include one or more block rules, settings rules, and/or furniture rules. Such block rules, settings rules, and/or furniture rules may, for instance, be used by generative design computing platform 110 in generating and/or optimizing one or more block models, settings models, and/or furniture models, respectively. For example, design rule set 188*a* may include one or more block rules 188*a*-1, one or more settings rules 188*a*-2, and one or more furniture rules 188*a*-3. Block rules 188*a*-1 may include information defining one or more rules of block layout, block adjacency, and/or other block features. Settings rules 188*a*-2 may include information defining one or more rules of settings layout, settings adjacency, and/or other settings features. Furniture rules 188*a*-3 may include information defining one or more rules of furniture layout, furniture groupings, and/or other furniture features.

Figure 2B:
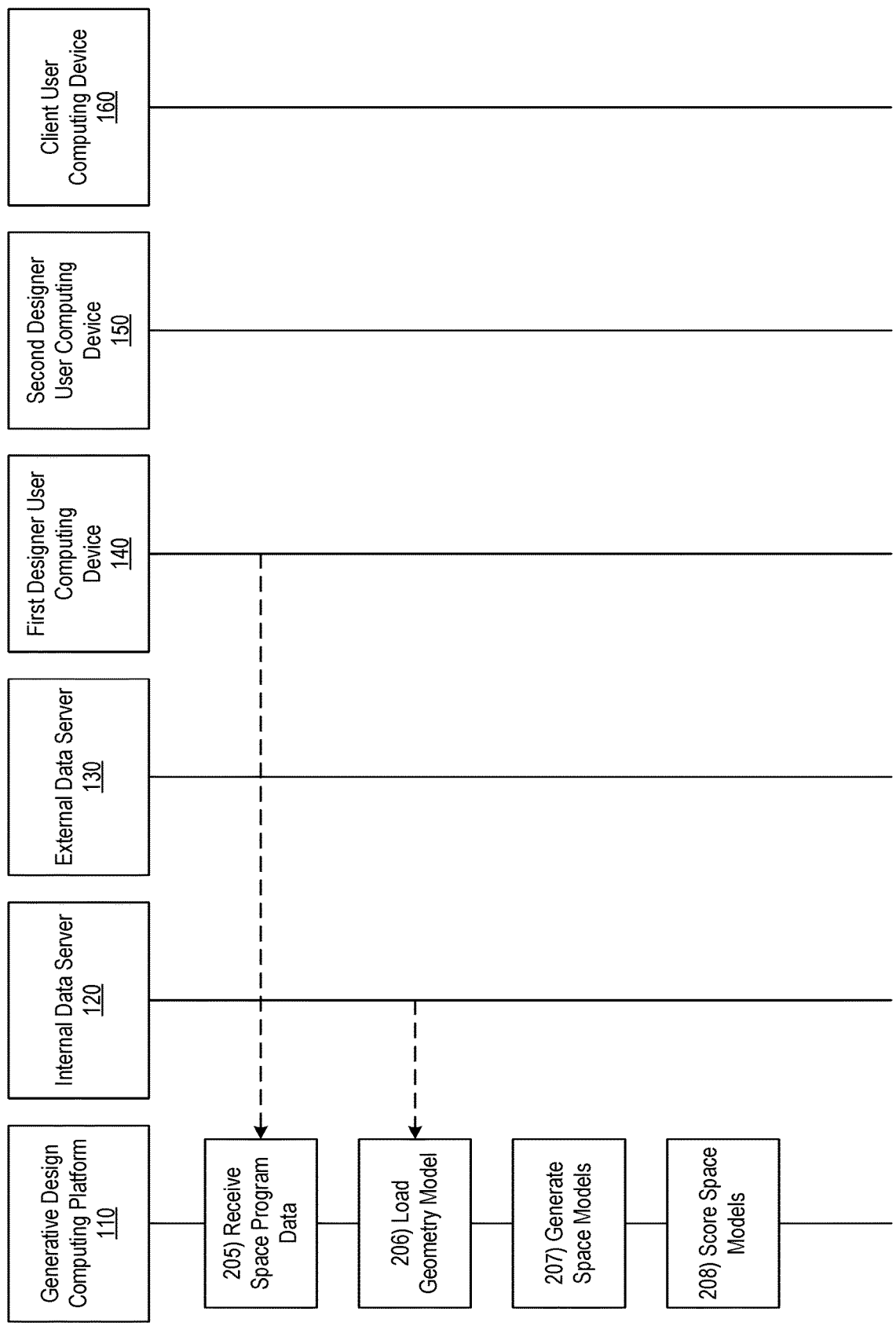

FIGS. 2A-2H depict an illustrative operating environment for generating space models and geometry models using a machine learning system with multi-platform interfaces in accordance with one or more example embodiments. Referring to FIG. 2A, at step 201, the generative design computing platform 110 may receive one or more drawing models from the internal data server 120 and/or the external data server 130, which may correspond to different space designs (e.g., floor plans, furniture location information, best-in-class designs, or the like). For example, in receiving the one or more drawing models, the generative design computing platform 110 may receive one or more two-dimensional computer-aided design (CAD) models that may be used to train one or more machine learning models to identify design parameters and/or to distinguish between different design parameters. In some instances, in receiving the one or more drawing models, the generative design computing platform 110 may receive a quantity of drawing models that is satisfactory and/or sufficient to train the one or more machine learning models to distinguish between different room types (e.g., meeting rooms, offices, common spaces, or the like) and/or other design features. This training may, for instance, configure and/or cause the generative design computing platform 110 to determine insights and/or relationships relating to square footage, adjacency (which may, e.g., define and/or indicate the proximity and/or location of various departments, settings, rooms, and/or other space features), and/or other typical and/or preferred features of physical spaces and/or relationships of features of physical spaces. In addition to or as an alternative to receiving the one or more drawing models at step 201, the generative design computing platform 110 may receive, request, or otherwise access photos, videos, and/or other media corresponding to physical spaces and may use the photos, videos, and/or other media to generate the one or more drawing models.

At step 202, the generative design computing platform 110 may identify a plurality of design parameters associated with each drawing model of the plurality of drawing models corresponding to the different space designs. In some instances, the generative design computing platform 110 may identify the plurality of design parameters based on user input (which may, e.g., be received at first designer user computing device 140, second designer user computing device 150, and/or another computing device, and then sent to the generative design computing platform 110). For example, a user may manually identify the design parameters derived from and/or otherwise associated with each drawing model. In these instances, in identifying the plurality of design parameters, the generative design computing platform 110 may identify a common set of design parameters for each of the plurality of drawing models. Additionally or alternatively, the generative design computing platform 110 may apply cognitive machine learning to the plurality of drawing models to identify the plurality of design parameters. In these instances, the generative design computing platform 110 may identify the plurality of design parameters based on graphical features derived from the drawing models and/or metadata linked to the drawing models, such as metadata information indicating an industry, geographic location, size, personality, and/or other characteristics of an organization linked to each of the plurality of drawing models. In addition, in these instances, the generative design computing platform 110 may identify different design parameters for each of the plurality of drawing models.

In some instances, in identifying the plurality of design parameters associated with each drawing model of the plurality of drawing models received at step 201, the generative design computing platform 110 may identify a plurality of design features prior to identifying the plurality of design parameters at step 202. These design features may, in some instances, be relatively common for organizations of the same business type (e.g., architecture and design firms may typically occupy spaces having a first common set of features, and these common features may be reflected in drawing models of the spaces occupied by such design firms, whereas law firms may typically occupy spaces having a second common set of features, and these common features may be reflected in drawing models of the spaces occupied by such law firms). To identify, group, and/or otherwise select these common features from various drawing models associated with different types of organizations, the generative design computing platform 110 may execute and/or otherwise use one or more cognitive machine learning algorithms. For example, the generative design computing platform 110 may identify, group, and/or otherwise select the plurality of design features associated with a particular drawing model of the plurality of drawing models by applying cognitive machine learning based on the organization and/or occupant corresponding to the particular drawing model of the plurality of drawing models. For instance, the generative design computing platform 110 may identify features that may be most applicable to drawing models associated with a specific organization, which in turn may enable the generative design computing platform 110 to draw inferences about features that may be applicable when creating space models and/or geometry models for other, similar organizations.

In some cases, for example, the generative design computing platform 110 may select the design features based on an industry, geographic location, size, personality, and/or other characteristics of an organization corresponding to each of the plurality of drawing models. For instance, for each organization and/or for each drawing model, the generative design computing platform 110 may identify a total square footage, a total number of offices, a total number of meeting spaces, a total number of community spaces, a number of seats per office, a number of seats per meeting space, a number of seats per community space, a percentage of the total square footage allocated to offices, a percentage of the total square footage allocated to meeting spaces, a percentage of the total square footage allocated to community space, an average office size, an average meeting space size, and/or other space metrics.

At step 203, the generative design computing platform 110 may train a machine learning engine (e.g., machine learning engine 112d) based on the plurality of drawing models corresponding to the different space designs and the plurality of design parameters associated with each drawing model of the plurality of drawing models corresponding to the different space designs. In training the machine learning engine, the generative design computing platform 110 may produce at least one geometry model corresponding to the plurality of drawing models. In particular, in producing the at least one geometry model, the generative design computing platform 110 may determine and/or otherwise produce a set of ranges, numerical constraints, and/or other quantifiable features and/or rules that may be applied by the generative design computing platform 110 in generating a space model for a physical space based on space program data (e.g., as illustrated in greater detail below). Additionally or alternatively, in producing the at least one geometry model, the generative design computing platform 110 may produce a layered model that may have sub-step-specific rules for executing different sub-steps of a generative design process (e.g., block rules for executing steps associated with generating a block model, settings rules for executing steps associated with generating a settings model, furniture rules for executing steps associated with generating a furniture model, and/or other layer-specific rules).

At step 204, the generative design computing platform 110 may store the at least one geometry model. In some instances, the generative design computing platform 110 may store the at least one geometry model locally (e.g., in the memory 112 and/or specifically in the generative design database 112b). Additionally or alternatively, the generative design computing platform 110 may store the at least one geometry model at a remote source, such as internal data server 120.

Referring to FIG. 2B, at step 205, the generative design computing platform 110 may receive space program data from the first designer user computing device 140. For example, the generative design computing platform 110 may receive first space program data identifying one or more parameters of a first physical space. In some instances, in receiving the first space program data, the generative design computing platform 110 may receive information identifying architectural details of the first physical space, such as line drawings identifying a shell of a building corresponding to the first physical space, window locations, ceiling heights, preferred views, plannable area, elevator locations, column locations, entrances, exits, doors, and/or other space features (which may, e.g., be included in a computer-aided design file). Additionally or alternatively, in receiving the first space program data, the generative design computing platform 110 may receive organization details of an organization that does or will occupy the first physical space, such as information indicating a total number of employees of the organization, projected growth rate, organizational breakdown (e.g., departments, teams, team compositions, relations between teams and/or departments). Additionally or alternatively, in receiving the first space program data, the generative design computing platform 110 may receive work style details for the first physical space, such as information indicating preferences related to having an open or closed floor plan, privacy concerns, environmental ambience, and/or other style preferences. Additionally or alternatively, in receiving the first space program data, the generative design computing platform 110 may receive budget details for the first physical space, such as information indicating a target and/or maximum price per square foot, and/or metric details for the first physical space, such as information indicating that some scoring factors are more important than others in the overall selection process.

In some instances, this first space program data (which may, e.g., be received by generative design computing platform 110 at step 205) may be set by or for an occupant of the first physical space, and may be received as user input received via an electronic form or survey. For example, the occupant of the first physical space may be prompted (e.g., by generative design computing platform 110, via one or more graphical user interfaces presented on one or more user computing devices) to select images, word clouds (e.g., graphical representations of words and/or groups of words displayed in a cloud format and associated with different themes and/or styles that may indicate different design preferences), and/or possible design elements that match their vision for the first physical space. As illustrated below, generative design computing platform 110 may use any and/or all of this user input in generating a plurality of space models for the first physical space. Additionally or alternatively, in receiving the first space information, the generative design computing platform 110 may receive user input defining specific preferences for one or more design elements of the first physical space, such as specific preferences for blocks (e.g., office departments and/or other distinct areas of the physical space), settings (e.g., room types and/or other sub-block features), and/or furniture items (e.g., individual pieces of furniture and/or other sub-settings features). Additionally or alternatively, in receiving the first space information, the generative design computing platform 110 may receive information indicating trends in third party data, industry standards, best-in-class floor plans, and/or other external data. As also illustrated below, generative design computing platform 110 may use any and/or all of this information in generating a plurality of space models for the first physical space.

At step 206, the generative design computing platform 110 may load a first geometry model from a database storing one or more geometry models (e.g., stored in the memory 112 or at the internal data server 120). In loading the first geometry model, the generative design computing platform 110 may load information defining a first plurality of design rules that may be part of and/or otherwise associated with the first geometry model, such as design rules that control and/or affect the quantities, locations, sizes, and/or other features of various space model design elements, such as blocks, settings, furniture, and/or other elements (e.g., number of blocks, settings, furniture, and/or other features; types of blocks, settings, furniture, and/or other features; locations of blocks, settings, furniture, and/or other feature; locations of hallways; and/or other features). In some instances, in loading the first geometry model, the generative design computing platform 110 may select the first geometry model from a plurality of geometry models using a machine learning engine trained on one or more best-in-class designs. For example, in loading the first geometry model, the generative design computing platform 110 may select a geometry model that was generated and/or produced at step 203 using the machine learning engine 112d. Additionally or alternatively, in loading the first geometry model, the generative design computing platform 110 may select the first geometry model based on the first space program data (e.g., received at step 205). For example, the architectural details of the physical space, organizational details of the physical space, work style details of the physical space, and/or budget details of the physical space may affect the selection of the first geometry model and thus may be used by generative design computing platform 110 as selection parameters in selecting the first geometry model.

At step 207, the generative design computing platform 110 may generate a first plurality of space models for the first physical space based on the first space program data and the first geometry model. For example, the generative design computing platform 110 may generate a plurality of space models (which may, e.g., be floor plans that include block models, settings models, and furniture models, as illustrated in greater detail below) based on the elements corresponding to the space program data received at step 205 and the geometry model loaded at step 206. In some instances, in generating the first plurality of space models, the generative design computing platform 110 may generate each space model of the first plurality of space models in a plurality of different data formats. For example, the generative design computing platform 110 may generate each space model of the first plurality of space models in a CAD format, a CET format, a Revit format, a SketchUp format, and/or one or more other formats. As illustrated in greater detail below, by generating each space model in different formats at step 207, the generative design computing platform 110 may define space models and/or the elements included in the space models only once at the outset of the design process, which may eliminate the need for downstream adjustments in formatting to be made and thus may provide improvements in efficiency when generating models, editing models, and/or exporting models.

In some instances, in generating the first plurality of space models, the generative design computing platform 110 may generate a plurality of block models for the first physical space (which may, e.g., indicate how departments and/or furniture settings are arranged on the floor plate). For example, the generative design computing platform 110 may generate the plurality of block models based on the first space program data and the first geometry model to determine where different departments of an organization may be located within the physical space, where hallways and/or walls may be located (e.g., between departments), and/or where and/or how other block level features may be implemented in the physical space. In some instances, the geometry model also may include adjacency rules (e.g., indicating that certain departments should be next to other departments, e.g., there may be rule indicating that the legal department should be next to the accounting department), and the generative design computing platform 110 may use and/or account for these adjacency rules in generating the block models (and/or in generating the settings models and/or furniture models, as discussed in greater detail below). In addition, the various block models that may be generated by the generative design computing platform 110 may correspond to different variations (e.g., in the locations and/or other implementation details of the departments and/or other block-level features). For example, the generative design computing platform 110 may determine that a legal department needs 6,000 square feet and a marketing department needs 20,000 square feet, and the generative design computing platform 110 may fit these departments into the first physical space in different locations and/or with different variations across different block models (which may, e.g., be further refined into detailed floor plans as settings models and furniture models are generated, as described below). In some instances, in generating the plurality of block models for the first physical space, the generative design computing platform 110 may take into account existing offices, rooms, and/or other elements in the first physical space that are in a fixed location (e.g., elements that are unable to be moved, elements that it is preferable and/or not desirable to move (e.g., because of cost issues, effort issues, and/or other issues), and/or elements that have characteristics that cause them to be fixed and/or otherwise immoveable). In these instances, the generative design computing platform 110 may incorporate the pre-determined, existing locations of these fixed elements into the plurality of block models being generated.

In some instances, in generating the plurality of block models for the first physical space, the generative design computing platform 110 may perform one or more pre-processing steps. For example, in performing the one or more pre-processing steps, the generative design computing platform 110 may perform a flood fill to create initial assumed locations for one or more specific departments (e.g., initially placing a legal department in a first portion of the block model, a human resources department in a second portion of the block model, etc.). In some instances, the generative design computing platform 110 may perform the flood fill based on known sizes of each department (which may, e.g., be expressed in terms of area, such as square footage, or in terms of occupancy, such as number of people or seats). In some instances, in performing the one or more pre-processing steps, the generative design computing platform 110 may iteratively generate various flood fill solutions and score the solutions accordingly (e.g., using one or more scoring methods as described below with regard to scoring of the block models).

After generating the plurality of block models, the generative design computing platform 110 may score the plurality of block models based on the first geometry model, which may produce a score for each block model. For instance, the first geometry model may include a plurality of design rules, constraints, and/or metrics that define the ideal locations and/or other properties of block-level features. In scoring each block model, the generative design computing platform 110 may compute how closely the particular block model adheres to the design rules, constraints, and/or metrics defined by the geometry model (e.g., by calculating the distances between the 'actual' values of the block model and the 'ideal' values of the geometry model, and then subtracting these distances from a perfect score of 1 or 100). Based on the scores for the block models, the generative design computing platform 110 may select a subset of the plurality of block models. For example, the generative design computing platform 110 may rank the plurality of block models based on their corresponding scores and then select a subset of the highest-scoring block models (e.g., the generative design computing platform 110 may select the block models with the five highest scores). In this way, higher-scoring block models that more closely adhere to the 'ideal' values defined in the geometry model may be used by the generative design computing platform 110 in generating settings models, as illustrated in greater detail below, while the other, lower-scoring block models may be discarded (which may, e.g., result in technical advantages, such as increased computational efficiency, reduced processing load, and/or reduced usage of network resources).

For each of the subset of the plurality of block models, the generative design computing platform 110 may generate a plurality of settings models, and each settings model may indicate different office or environment settings within different blocks, such as the specific locations of offices, meeting rooms, common (shared) spaces, and/or other settings within different blocks, as well as other features of these various settings, such as their size, shape, quantity, intended purpose, and/or other features. In addition, each settings model (which may, e.g., be generated by the generative design computing platform 110) may correspond to a particular block model of the subset of the plurality of block models. After generating the plurality of settings models, the generative design computing platform 110 may score the plurality of settings models based on the first geometry model (e.g., using one or more evaluation measures), which may produce a score for each settings model. Similar to how the first geometry model may include a plurality of design rules, constraints, and/or metrics that define the ideal locations and/or other properties of block-level features, as discussed above, the first geometry model also may include a plurality of design rules, constraints, and/or metrics that define the ideal locations and/or other properties of settings-level features. Thus, like when scoring the block models, in scoring each settings model, the generative design computing platform 110 may compute how closely the particular settings model adheres to the design rules, constraints, and/or metrics defined by the geometry model (e.g., by calculating the distances between the 'actual' values of the settings model and the 'ideal' values of the geometry model, and then subtracting these distances from a perfect score of 1 or 100). Based on the scores for the settings models, the generative design computing platform 110 may select a subset of the plurality of settings models. For example, the generative design computing platform 110 may rank the plurality of settings models based on their corresponding scores and then select a subset of the highest-scoring settings models (e.g., the generative design computing platform 110 may select the settings models with the five highest scores). In this way, higher-scoring settings models that more closely adhere to the 'ideal' values defined in the geometry model may be used by the generative design computing platform 110 in generating furniture models, as illustrated in greater detail below, while the other, lower-scoring settings models may be discarded (which may, e.g., result in technical advantages, such as increased computational efficiency, reduced processing load, and/or reduced usage of network resources).

For each of the subset of the plurality of settings models, the generative design computing platform 110 may generate a plurality of furniture models, which may indicate which specific pieces of furniture are to be located in which office or environment settings. In addition, each furniture model (which may, e.g., be generated by the generative design computing platform 110) may correspond to a particular settings model of the subset of the plurality of settings models.

After generating the plurality of furniture models, the generative design computing platform 110 may score the plurality of furniture models based on the first geometry model, which may produce a score for each furniture model. Similar to how the first geometry model may include a plurality of design rules, constraints, and/or metrics that define the ideal locations and/or other properties of block-level features and settings-level features, as discussed above, the first geometry model also may include a plurality of design rules, constraints, and/or metrics that define the ideal locations and/or other properties of furniture-level features. Thus, like when scoring the block models and the settings models, in scoring each furniture model, the generative design computing platform 110 may compute how closely the particular furniture model adheres to the design rules, constraints, and/or metrics defined by the geometry model (e.g., by calculating the distances between the 'actual' values of the furniture model and the 'ideal' values of the geometry model, and then subtracting these distances from a perfect score of 1 or 100). Based on the scores for the furniture models, the generative design computing platform 110 may select a subset of the plurality of furniture models. For example, the generative design computing platform 110 may rank the plurality of furniture models based on their corresponding scores and then select a subset of the highest-scoring furniture models (e.g., the generative design computing platform 110 may select the settings models with the five highest scores). In addition, the generative design computing platform 110 may output the selected subset of furniture models as the first plurality of space models. In this way, the highest-scoring furniture models that more closely adhere to the 'ideal' values defined in the geometry model may be used by the generative design computing platform 110 in determining and/or outputting the space models (which may, e.g., include complete details for block-level features, settings-level features, and furniture-level features). In addition, this staged and score-based approach (which may, e.g., be implemented by the generative design computing platform 110 in determining and/or outputting the space models) may provide various technical advantages, such as increased computational efficiency, reduced processing load, and/or reduced usage of network resources.

In addition, by generating the first plurality of space models using the iterative generative design algorithm illustrated above (e.g., by iteratively generating, scoring, and improving the block models, settings models, and furniture models), generative design computing platform 110 may generate and output an optimal space model and/or a set of optimal space models in a highly efficient manner. Further, by moving through the stage gates illustrated above (e.g., only generating settings models once block models have been solved for, and only generating furniture models once settings models have been solved for), the generative design computing platform 110 may reduce consumption of computational bandwidth and achieve faster computing performance. And these benefits may be achieved while accounting for both occupant and designer preferences (e.g., as indicated in the space program data) and a more agnostic set of design rules (e.g., as defined in the geometry model).

In some instances, in generating the first plurality of space models, the generative design computing platform 110 may generate one or more multi-floor stacking plans (which may, e.g., be floor plans that span multiple levels of a building, set of buildings, campus, or other space). In these instances, using a similar manner as described above with the block models to determine where various departments may fit best in a particular part of a particular floor, the generative design computing platform 110 may identify that one or more specific departments should be located on a specific floor for each of a plurality of floors available in the space, and where in the specific floor each of these departments should fit. In this way, the generative design computing platform 110 may place different departments throughout different floors of a given space, thereby producing a multi-floor stacking plan.

In some instances, using similar methods as described above with regard to the multi-floor stacking plans, the generative design computing platform 110 may generate block models that span across multiple buildings and/or other spaces of a campus, which may enable the generative design computing platform 110 to perform campus and/or other large scale planning. For example, generative design computing platform 110 may place different departments throughout different floors of different buildings in a given campus, thereby producing a campus plan that may include one or more multi-floor stacking plans (which may, e.g., in turn may include a block model for each floor). In some instances, the generative design computing platform 110 may generate space models that involve different building floor plate types. For instance, a particular space may have multiple plannable areas on the same floor of a building (e.g., in two related and/or connected towers of the building), and the generative design computing platform 110 may generate models for these different plannable areas using techniques similar to those discussed above and/or below (e.g., by placing blocks, settings, and/or furniture in the different plannable areas while accounting for other elements already placed in such areas).

At step 208, the generative design computing platform 110 may score the first plurality of space models based on the first geometry model. For example, the generative design computing platform 110 may calculate and/or otherwise produce a score for each space model based on the design rules, constraints, and/or metrics included in the first geometry model. In scoring the first plurality of space models, the generative design computing platform may identify a level and/or degree of compliance of the first plurality of space models with one or more metrics defined by the first geometry model. For example, the first geometry model may include the one or more metrics and the generative design computing platform 110 may calculate and/or otherwise assess to what degree the first plurality of space models are in compliance with the first geometry model (e.g., by calculating one or more distances, as described in the examples above with respect to the block models, settings models, and furniture models that may provide the basis for and/or make up the space models; and then summing and/or averaging such distance values). In some instances, the geometry model may include metrics such as views to outside and/or preferred views, daylight, setting suitability (e.g., an evaluation of each furniture setting and whether it is placed in a suitable area—for example, are work cafes placed near high-trafficked areas/workstations placed in quiet areas?), space syntax, aggregate compliance, adjacencies (which may, e.g., include one or more rules defining that one or more specific departments should preferably be located next to or within a predetermined distance of one or more other specific departments, such as a rule specifying that a product management department should be located next to an engineering department or a rule specifying that a legal department should be located next to an accounting department), and/or buzz/distraction (which may, e.g., include one or more rules for balancing chance social encounters among occupants of the space with potential distractions encountered or experienced by occupants of the space because of certain layout features). In these instances, in scoring the first plurality of space models, the generative design computing platform 110 may calculate and/or otherwise produce a score for each space model based on how well each space model provides features aligned with these metrics.

For example, in scoring the first plurality of space models, the generative design computing platform 110 may quantify and/or otherwise assess the views to the outside, preferred views, and/or access to daylight metrics by identifying, for each work point in a space model, a line from a chair at the work point to a window in the physical space (e.g., as indicated in the given space model), computing a distance of the line, and identifying if any objects are in between the work point (e.g., a chair, a sofa, a seat, or the like) and the window (e.g., a wall, partition, or the like) or if the distance exceeds a predetermined threshold (e.g., if the distance is too far for a person located at the work point to enjoy the view). In making this assessment, the generative design computing platform 110 also may take into account what the view from the given work point includes (e.g., a view of a courtyard may be more desirable than a view of a parking lot or a wall of a neighboring building). The generative design computing platform 110 also may take into account a position of the building relative to the sun. Any and/or all of these considerations may be quantified in accordance with the metrics and may be used by the generative design computing platform 110 in scoring each space model of the first plurality of space models.

As another example, in scoring the first plurality of space models, the generative design computing platform 110 may quantify and/or otherwise assess the setting suitability for each work point in a space model and/or each setting in a space model by identifying, for the given work point or setting, surroundings of the work point or setting and determining whether and/or to what extent the work point or setting complies with the rules of the settings model. For example, in making such an assessment, the generative design computing platform 110 may, in some instances, determine occupancy for a given space, predict a decibel level in the space based on the predicted occupancy, and identify how far away from the space an office or other work point should be, based on the decibel level, so as to maintain a quiet office or work point.

As another example, in scoring the first plurality of space models, the generative design computing platform 110 may quantify, assess, and/or otherwise score the space syntax for a given space model by identifying predicted traffic patterns in the physical space in view of the layout of the space model (e.g., how many turns to move from one location to another location in the space, how clear are corridors in the space, how adjacent are related teams, how well does the space provide possibilities for chance encounters, and/or other space syntax factors). For example, in scoring a given space model, the generative design computing platform 110 may balance maintaining short distances between frequently visited portions of the physical space for various individuals against allowing individuals in the space to experience chance encounters (e.g., it may be desirable for everything located in the space to be conveniently accessible to people affiliated with different teams, while still allowing people affiliated with different teams to encounter someone from another team on occasion). After quantifying and/or otherwise assessing one or more of the features described above, the generative design computing platform 110 may calculate and/or otherwise determine a score for each metric with respect to each space model of the first plurality of space models (e.g., 1-10, or the like). The generative design computing platform 110 then may, for instance, compute an aggregate score for each space model of the first plurality of space models by computing an average of the metric scores determined for the particular space model.

Referring to FIG. 2C, at step 209, the generative design computing platform 110 may rank the first plurality of space models based on the score for each space model (e.g., the scores produced at step 208). In doing so, the generative design computing platform 110 may produce a first ranked list of space models for the first physical space. In some instances, the generative design computing platform 110 may rank the first plurality of space models based on the metric scores for each space model and/or the aggregate score for each space model.

At step 210, the generative design computing platform 110 may generate first user interface data that includes the first ranked list of space models produced at step 209. The first user interface data generated by the generative design computing platform 110 may define one or more portions of a graphical user interface, such as the user interface described in greater detail below in connection with FIG. 3. At step 211, the generative design computing platform 110 may send, via the communication interface 113, the first user interface data to the first designer user computing device 140. In some instances, by sending the first user interface data to the first designer user computing device 140, the generative design computing platform 110 may cause the first designer user computing device 140 to display a user interface that includes at least a portion of the first ranked list of space models. In some instances, sending the user interface data to the first designer user computing device 140 may cause the first designer user computing device 140 to display one or more of the scores computed for each space model at step 208 (e.g., the metric scores, aggregate scores, and/or other scores discussed in the examples above).

Figures 3, 4:
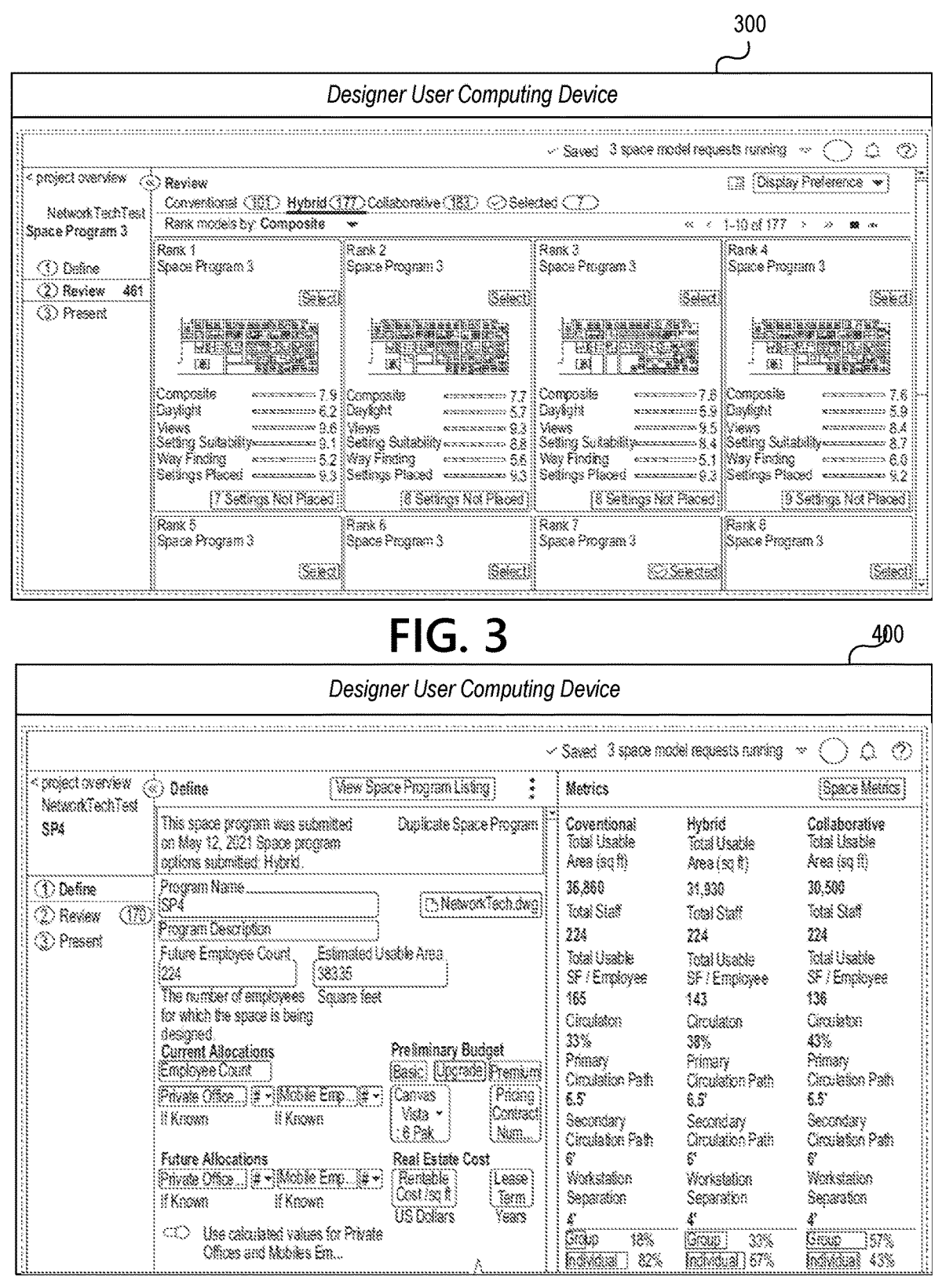

At step 212, the first designer user computing device 140 may display a user interface that includes at least a portion of the first ranked list of space models. For example, the first designer user computing device 140 may display a graphical user interface similar to graphical user interface 300, which is shown in FIG. 3, based on receiving the first user interface data from the generative design computing platform 110. As seen in FIG. 3, graphical user interface 300 may include information identifying one or more different space models generated by the generative design computing platform 110, ranking information indicating the rank and/or score of one or more space models, and/or visual information indicating graphical views of one or more space models generated by the generative design computing platform 110 and/or portions thereof. In some instances, the first designer user computing device 140 may display such a user interface based on or in response to receiving the user interface data from the generative design computing platform 110. Additionally or alternatively, in displaying the user interface that includes at least a portion of the first ranked list of space models, the first designer user computing device 140 may display the metric scores and/or aggregate score computed at step 208 (and/or other scores discussed in the examples above).

In some instances, in displaying the user interface that includes at least a portion of the first ranked list of space models, the first designer user computing device 140 may display each of the space models in a grid along with metrics corresponding to each space model (e.g., based on the user interface data received from the generative design computing platform 110). In these instances, in response to receiving user input selecting a portion of a displayed space model, the first designer user computing device 140 may display a rendering of and/or other graphics associated with one or more work points (e.g., seats) in the space model, along with calculations of views to the outside from each of the one or more work points and/or other metrics associated with each work point.

Figure 2D:
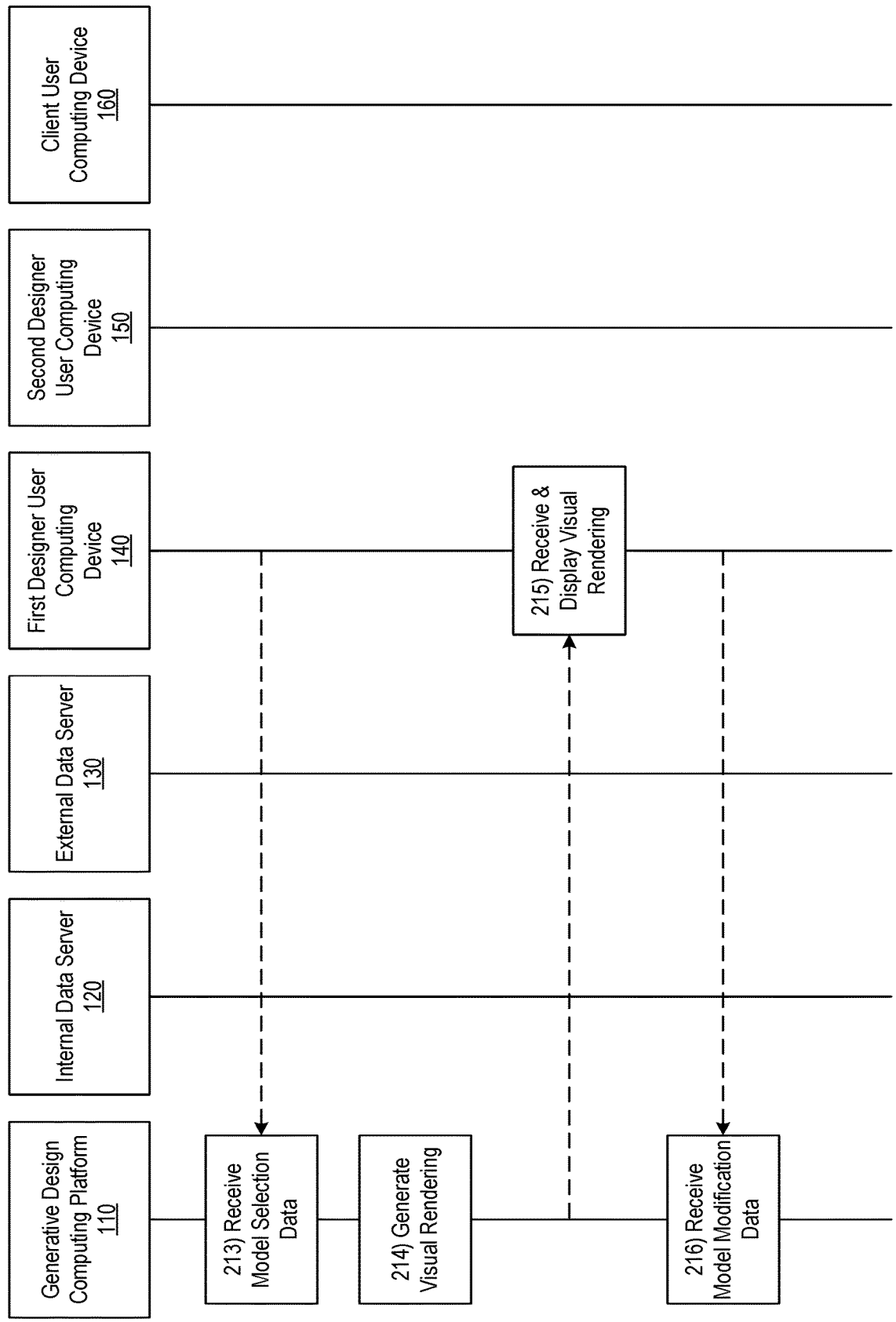

Referring to FIG. 2D, at step 213, the generative design computing platform 110 may receive data indicating a selection of the first space model from the first list of ranked space models. For example, the generative design computing platform 110 may receive the data indicating the selection of the first space model from the first list of ranked space models via the communication interface 113 and from the first designer user computing device 140.

At step 214, the generative design computing platform 110 may generate a visual rendering of the first space model. For example, the generative design computing platform 110 may generate the visual rendering of the first space model in response to or based on receiving the data indicating the selection of the first space model from the first ranked list of space models. In some instances, in generating the visual rendering of the first space model, the generative design computing platform 110 may generate a two-dimensional or three dimensional rendering of the first space model. In some instances, in generating such a rendering, the generative design computing platform 110 may use rendering software built into a drawing tool to convert blocks, settings, furniture, and/or other elements indicated in the space model into two-dimensional and/or three-dimensional objects that are viewable by a user and/or that reflect views of the space if the space model were to be implemented.

At step 215, the generative design computing platform 110 may send the visual rendering of the first space model to the first designer user computing device 140 (e.g., via the communication interface 113). In some instances, sending the visual rendering of the first space model to the first designer user computing device 140 may cause the first designer user computing device 140 to display a user interface that includes at least a portion of the visual rendering of the first space model. For example, by sending the visual rendering of the first space model to the first designer user computing device 140, the generative design computing platform 110 may cause the first designer user computing device 140 to display a user interface similar to graphical user interface 400, which is shown in FIG. 4 and described below.

In some instances, a user of the first designer user computing device 140 may be able to modify parameters of the space model for various reasons, such as to further refine the space model, to optimize parameters beyond the calculations made by the generative design computing platform 110, and/or to refine the space model to account for social distancing requirements. For example, the first designer user computing device 140 may display a graphical user interface similar to graphical user interface 400, which is shown in FIG. 4. In doing so, the first designer user computing device 140 may allow users to modify variables that may control, alter, and/or otherwise affect the layout of a space model and/or other parameters of a space model. For instance, the first designer user computing device 140 may display and/or otherwise present one or more user-selectable controls allowing a user to modify variables such as circulation percentage (which may, e.g., impact corridor width and/or other parameters affecting circulation of individuals within the space), group space percentage (which may, e.g., impact the relative amount of space allocated to common space), office and workstation size (which may, e.g., impact the sizes of various work points to optimize for social distancing requirements), sharing ratio (which may, e.g., impact whether and to what extent workspaces are configured as shared hot spots instead of as reserved desks), and/or other variables.

In these instances, as one or more of the variables are modified, the first designer user computing device 140 may show an impact of the modifications (e.g., by displaying updated information indicating how many people can fit into the office and/or other impacts of the variable modification). This updated data may, for instance, be determined by the first designer user computing device 140, or the first designer user computing device 140 may send the modifications to the generative design computing platform 110 (which may, e.g., calculate and/or otherwise determine the impacts of the variable modification and return data indicating the impacts of the variable modification to the first designer user computing device 140). In some instances, the first designer user computing device 140 may receive user input corresponding to new building blocks, such as shielding to be deployed between workers and/or other space materials designed with antiviral properties. The first designer user computing device 140 then may send this user input and/or other information associated with the new building blocks to generative design computing platform 110, which may incorporate them into the space model (e.g., by re-generating the space model and/or one or more other space models, e.g., by re-executing one or more of the steps described above). Additionally or alternatively, the first designer user computing device 140 may receive user input identifying one or more pieces of furniture that are already owned by the occupant of the space, and may send this user input and/or other information associated with the one or more pieces of furniture that are already owned by the occupant of the space to generative design computing platform 110. The generative design computing platform 110 then may incorporate such furniture into the space model (e.g., by re-generating the space model and/or one or more other space models, e.g., by re-executing one or more of the steps described above). In this way, the generative design computing platform 110 may generate one or more space models indicating potential reconfigurations of already-owned furniture (e.g., to facilitate compliance with new social distancing requirements in existing spaces, such as in existing office spaces) rather than proposing new space models that involve purchasing and/or deploying an entirely new suite of furniture.

At step 216, the generative design computing platform 110 may receive data indicating a user modification of the first space model (e.g., via the communication interface 113 and from the first designer user computing device 140). In some instances, the data indicating the user modification of the first space model may correspond to a user modification received by the first designer user computing device 140 via the graphical user interface displayed at step 215. For example, at step 216, the generative design computing platform 110 may receive data indicating a user modification such as a refinement to the space model and/or a manual optimization of one or more parameters underlying the space model, as in the examples discussed above.

Referring to FIG. 2E, at step 217, based on or in response to receiving the data indicating the user modification of the first space model, the generative design computing platform 110 may update a machine learning engine executed on the generative design computing platform 110. For example, the generative design computing platform 110 may update and/or retrain the machine learning engine based on the data indicating the user modification of the first space model. For instance, to the extent that a user manually refined a layout of the space model and/or manually optimized one or more parameters underlying the space model, such refinements and/or optimizations may be captured by the generative design computing platform 110 and used to retrain the machine learning engine, so that such refinements and/or optimizations may be automatically implemented by the generative design computing platform 110 when generating future space models. Additionally or alternatively, in updating the machine learning engine, the generative design computing platform 110 may cause the machine learning engine 112d to automatically update the first geometry model and/or metrics corresponding to the first geometry model. For instance, to the extent that the manual refinements and/or optimizations touch on elements of the geometry model and/or its associated metrics, the generative design computing platform 110 may update the geometry model and/or the metrics corresponding to the geometry model, so that the refinements and/or optimizations may be automatically implemented by the generative design computing platform 110 when generating future space models based on the same geometry model.

Subsequently, the generative design computing platform 110 may continue processing space program data and/or generating space models for other physical spaces, similar to how the generative design computing platform 110 may process space program data and generate space models in the examples discussed above. For example, at step 218, the generative design computing platform 110 may receive second space program data (e.g., via the communication interface 113 and from second designer user computing device 150). For example, the generative design computing platform 110 may receive information identifying one or more parameters of a second physical space different from the first physical space. In some instances, actions performed at step 218 may be similar to those described above at step 205 with regard to receiving the first space program data.

At step 219, the generative design computing platform 110 may load a second geometry model from the database storing the one or more geometry models. For example, the generative design computing platform 110 may load information defining a second plurality of design rules. In some instances, actions performed at step 219 may be similar to those described above at step 206 with regard to loading the first geometry model. At step 220, the generative design computing platform 110 may generate a second plurality of space models for the second physical space based on the second space program data and the second geometry model. In some instances, actions performed at step 220 may be similar to those described above at step 207 with regard to generating the first plurality of space models.

Referring to FIG. 2F, at step 221, based on the second geometry model, the generative design computing platform 110 may score the second plurality of space models. In some instances, in scoring the second plurality of space models, the generative design computing platform 110 may produce a score for each space model of the second plurality of space models. In some instances, actions performed at step 221 may be similar to those described above at step 208 with regard to scoring the first plurality of space models. At step 222, the generative design computing platform 110 may rank the second plurality of space models based on the score for each space model of the second plurality of space models. In some instances, by ranking the second plurality of space models, the generative design computing platform 110 may produce a second ranked list of space models. In some instances, actions performed at step 222 may be similar to those described above at step 209 with regard to ranking the first plurality of space models.

At step 223, the generative design computing platform 110 may generate second user interface data that includes the second ranked list of space models. In some instances, actions performed at step 222 may be similar to those described above at step 210 with regard to generating the first user interface data. At step 224, the generative design computing platform 110 may send the second user interface data to the second designer user computing device 150 (e.g., via the communication interface 113). In some instances, in sending the second user interface data to the second designer user computing device 150, the generative design computing platform 110 may cause the second user computing device to display a user interface that includes at least a portion of the second ranked list of space models. In some instances, actions performed at step 224 may be similar to those described above at step 211 with regard to sending the first user interface data.

Figures 5, 6:
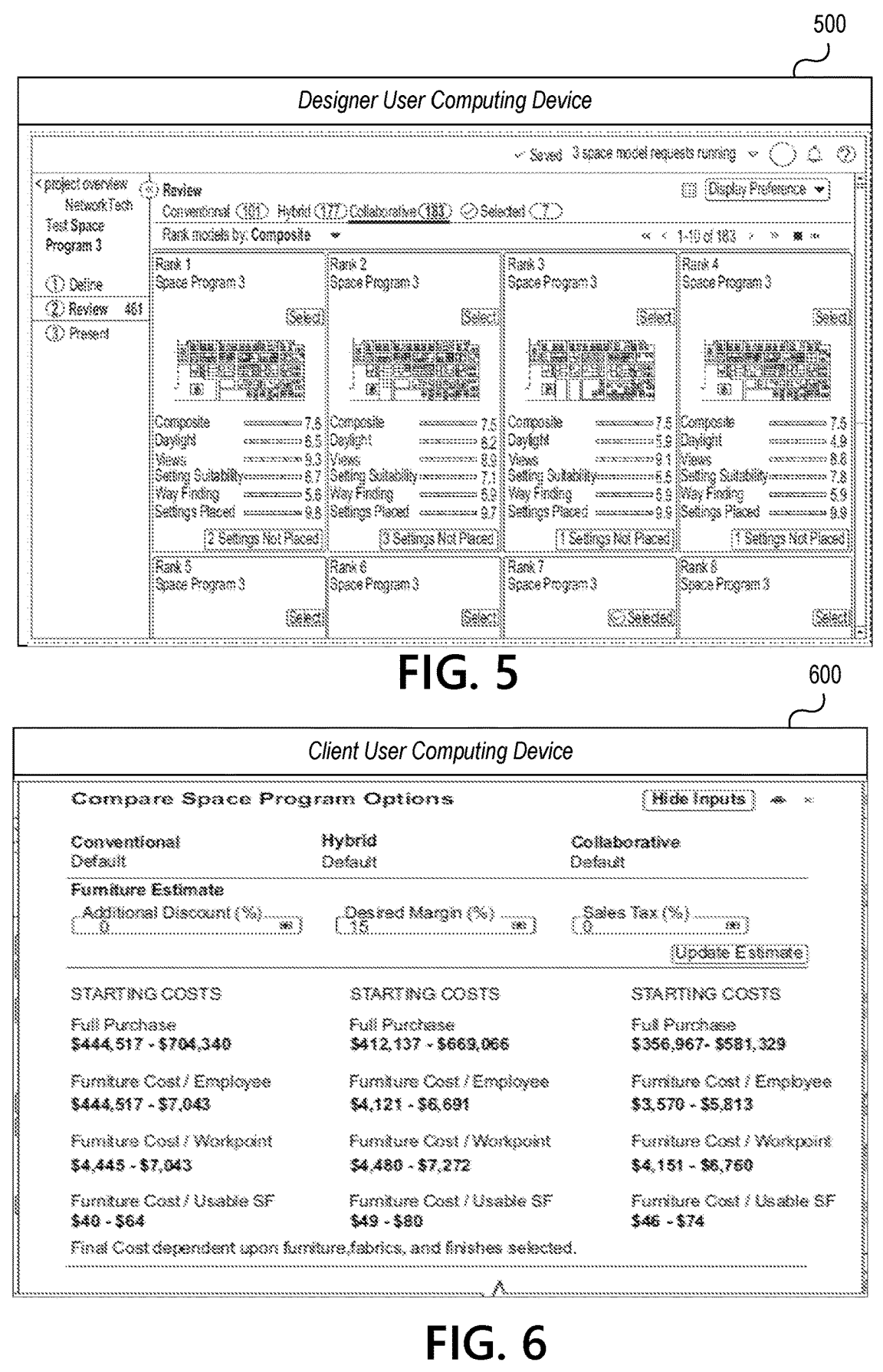

Referring to FIG. 2G, at step 225, based on the second user interface data, the second designer user computing device 150 may display a user interface that includes at least a portion of the second ranked list of space models. In some instances, the second designer user computing device 150 may display a graphical user interface similar to graphical user interface 500, which is shown in FIG. 5. In some instances, actions performed at step 225 may be similar to those described above at step 212 with regard to displaying a user interface. For example, as seen in FIG. 5, graphical user interface 500 may include information identifying one or more different space models generated by the generative design computing platform 110 for the second physical space, ranking information indicating the rank and/or score of the one or more space models, and/or visual information indicating graphical views of the one or more space models generated by the generative design computing platform 110 and/or portions thereof.

Subsequently, the generative design computing platform 110 may receive and process a request to export one or more space models. As illustrated in greater detail below, in processing such a request, the generative design computing platform 110 may export data in various different formats, using one or more of the multi-platform interoperability features described herein. In particular, and as described above (e.g., with respect to step 207), the generative design computing platform 110 may generate each space model of a plurality of space models in a plurality of different data formats (e.g., in a CAD format, a CET format, a Revit format, a SketchUp format, and/or one or more other formats), and this multi-format generation may expedite the process by which data may be exported in different formats.

For example, at step 226, the generative design computing platform 110 may receive data indicating a request to export a space model (e.g., the first space model) to a first design tool. In some instances, the generative design computing platform 110 may receive the data indicating the request to export the space model to the first design tool from the first designer user computing device 140 and via the communication interface 113. In some instances, in receiving the data indicating the request to export the space model to the first design tool, the generative design computing platform 110 may receive data indicating a request to export a space model that is defined in a plurality of different data formats (e.g., in a CAD format, a CET format, a Revit format, a SketchUp format, and/or one or more other formats) in a specific format that is compatible with and/or otherwise may be processed using the first design tool.

At step 227, in response to receiving the data indicating the request to export the space model to the first design tool, the generative design computing platform 110 may generate one or more first drawing files based on the first space model. In some instances, in generating such drawing files, the generative design computing platform 110 may select a first data format of the plurality of data formats (e.g., in which the first drawing files should be generated and/or outputted) based on the first design tool (e.g., based on the compatibility of the first design tool with different drawing file formats). In these instances, once the first data format has been selected, the generative design computing platform 110 may extract first format-specific data (which may, e.g., be defined in the first data format) from the first space model. In particular, and as discussed above, the first space model may have been initially generated in a plurality of different data formats (e.g., in a CAD format, a CET format, a Revit format, a SketchUp format, and/or one or more other formats). Thus, to generate drawing files from the first space model in any particular format, the generative design computing platform 110 might only need to extract format-specific data from the first space model (which may, e.g., provide many technical advantages, such as increased efficiency, reduced processing load, and/or reduced consumption of network resources). Once the first format-specific data has been extracted, the generative design computing platform 110 may create the one or more first drawing files by writing the first format-specific data extracted from the first space model into one or more new drawing files defined according to the first data format.

At step 228, the generative design computing platform 110 may send the one or more first drawing files to the first designer user computing device 140 (e.g., via the communication interface 113). In some instances, by sending the one or more first drawing files to the first designer user computing device 140, the generative design computing platform 110 may cause the first designer user computing device 140 to display the one or more first drawing files. Referring to FIG. 2H, at step 229, the first designer user computing device 140 may receive and display the one or more first drawing files.

Subsequently, the generative design computing platform 110 may generate and/or provide one or more user interfaces that enable a customer (e.g., an occupant of the physical space) to purchase one or more furniture elements associated with a space model and/or otherwise view and/or implement the space model. For example, at step 230, the generative design computing platform 110 may generate and send one or more commands directing client user computing device 160 to display a graphical user interface that includes a user-selectable furniture-purchase element. In some instances, in generating and sending the one or more commands directing the client user computing device 160 to display a graphical user interface that includes a user-selectable furniture-purchase element, the generative design computing platform 110 may cause the client user computing device 160 to display a graphical user interface that includes a user-selectable furniture-purchase element. For example, the client user computing device 160 may display a graphical user interface similar to graphical user interface 600, which is shown in FIG. 6. As seen in FIG. 6, graphical user interface 600 may include information about a space model (e.g., metrics, scores, details associated with blocks, settings, and/or furniture, and/or other information), one or more renderings of the space model, and/or one or more user-selectable options enabling adoption of the space model and/or purchasing of one or more furniture items associated with the space model. In some instances, graphical user interface 600 may include final pricing information for the space model (e.g., based on included blocks, settings, furniture, and/or other information), which may be based on pricing information pulled from an internal and/or external data source. For instance, in generating the user interface(s) and/or causing the client user computing device 160 to display such user interface(s), the generative design computing platform 110 may calculate and/or otherwise determine cost estimates and/or price estimates indicating a predicted cost of building and/or otherwise implementing the space model. For example, the generative design computing platform 110 may calculate and/or otherwise determine an estimated cost of building out the settings specified in the space model (e.g., based on data maintained and/or stored by the generative design computing platform 110 indicating standard and/or average costs for similar settings in similar spaces). Additionally or alternatively, the generative design computing platform 110 may calculate and/or otherwise determine an estimated cost of purchasing the one or more specified pieces of furniture in the space model (e.g., based on unit-level pricing data and/or other details, which may, e.g., be retrieved by the generative design computing platform 110 from another system or database, such as a Harbor database).

Figure 8:
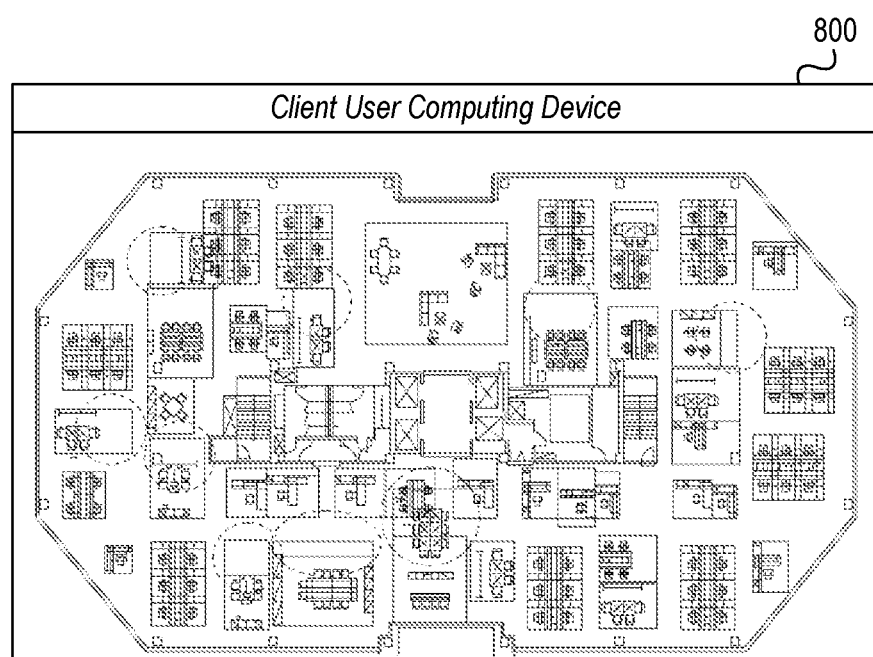
FIG. 8 depicts an additional illustrative user interface for generating space models and geometry models using a machine learning system with multi-platform interfaces in accordance with one or more example embodiments.

In some instances, in generating one or more user interfaces associated with the space model, the generative design computing platform 110 may determine that there is extra space (e.g., positive flex) in the plan or not enough space (e.g., negative flex) in the plan and may generate such user interfaces to indicate and/or otherwise enable interaction with this positive flex and/or negative flex. Thus, in displaying the one or more user interfaces associated with the space model, the client user computing device 160 may display a space model with positive flex and/or negative flex. For example, in displaying the space model with positive flex, the client user computing device 160 may display a floor plan that has room for additional furniture. In these instances, a user of the client user computing device 160 (who may e.g., be a designer) may select additional furniture to fill the space, and these selections may be communicated by the client user computing device 160 to the generative design computing platform 110, which may update one or more data records to indicate the selections and/or other changes to the space model. In displaying the space model with negative flex, the client user computing device 160 may display furniture that exceeds the available space in the floor plan (e.g., a couch and/or other furniture that exceeds the dimensions for a particular space). In these instances, a user of the client user computing device 160 may expand a corresponding block within the space model to account for any additional needed space, and this expansion and/or other associated changes may be communicated by the client user computing device 160 to the generative design computing platform 110, which may update one or more data records to indicate the expansion and/or other changes to the space model. In some instances, rather than presenting the option to reconfigure furniture to a user, a computing device (such as the client user computing device 160) may mimic the flexibility of a designer, and automatically modify the floor plan accordingly based on available space. In some instances, in displaying the positive and/or negative flex, the client user computing device 160 may display a graphical user interface similar to graphical user interface 800, which is shown in FIG. 8.

At step 231, the generative design computing platform 110 may receive furniture selection information indicating an order for one or more of the furniture items. For example, the furniture selection information may be based on a user input received via the graphical user interface displayed by the client user computing device 160 at step 230, and may be sent to the generative design computing platform 110 from the client user computing device 160. At step 232, the generative design computing platform 110 may process the order for the one or more furniture items specified in the furniture selection information received at step 231. For example, the generative design computing platform 110 may cause the one or more furniture items to be purchased and sent to an address specified by a user of the client user computing device 160.

Subsequently, the generative design computing platform 110 may repeat one or more steps of the example sequence discussed above in generating other geometry models, generating other space models, and/or outputting other drawing files associated with various space models. In addition, the generative design computing platform 110 may continuously update its machine learning engine 112d based on user input and/or other data received by generative design computing platform 110, so as to continuously and automatically optimize the generation of geometry models and space models.

In some instances, user applications may be designed and implemented that integrate with the features described in steps 201-231, which may allow for further customization and functionality beyond that described above. For example, one or more of the features described above may hosted on and/or provided by a cloud-based software-as-a-service (SaaS) platform on top of which various designers and/or developers may build customized applications for use by themselves or others. These customized applications may, for instance, be hosted on the generative design computing platform 110 or on different and/or external computing platforms. In some instances, these customized applications may integrate with, use, and/or replace functionality and/or features of the tools described above. For instance, any and/or all aspects of a customized application may be presented as additional or alternative options in a setting selector tool, which may be executed on and/or integrated with the generative design computing platform 110.

In some instances, any and/or all of the data that is generated and/or used by the generative design computing platform 110 may be stored and/or otherwise maintained in a single, centralized project asset and designer database. Such a database may, for example, also include items from other sources, such as salesforce data and/or scout data. In some arrangements, such a centralized database may be made up of multiple tables and/or subsidiary databases, such as a project asset database (which may, e.g., store data in connection with specific projects, such as space models and/or other items for specific projects), a designer database (which may, e.g., store designer preferences), and a settings vault (which may, e.g., store data about specific furniture items and/or may connect to one or more external databases, such as Herman Miller's Harbour database).

Figure 7:
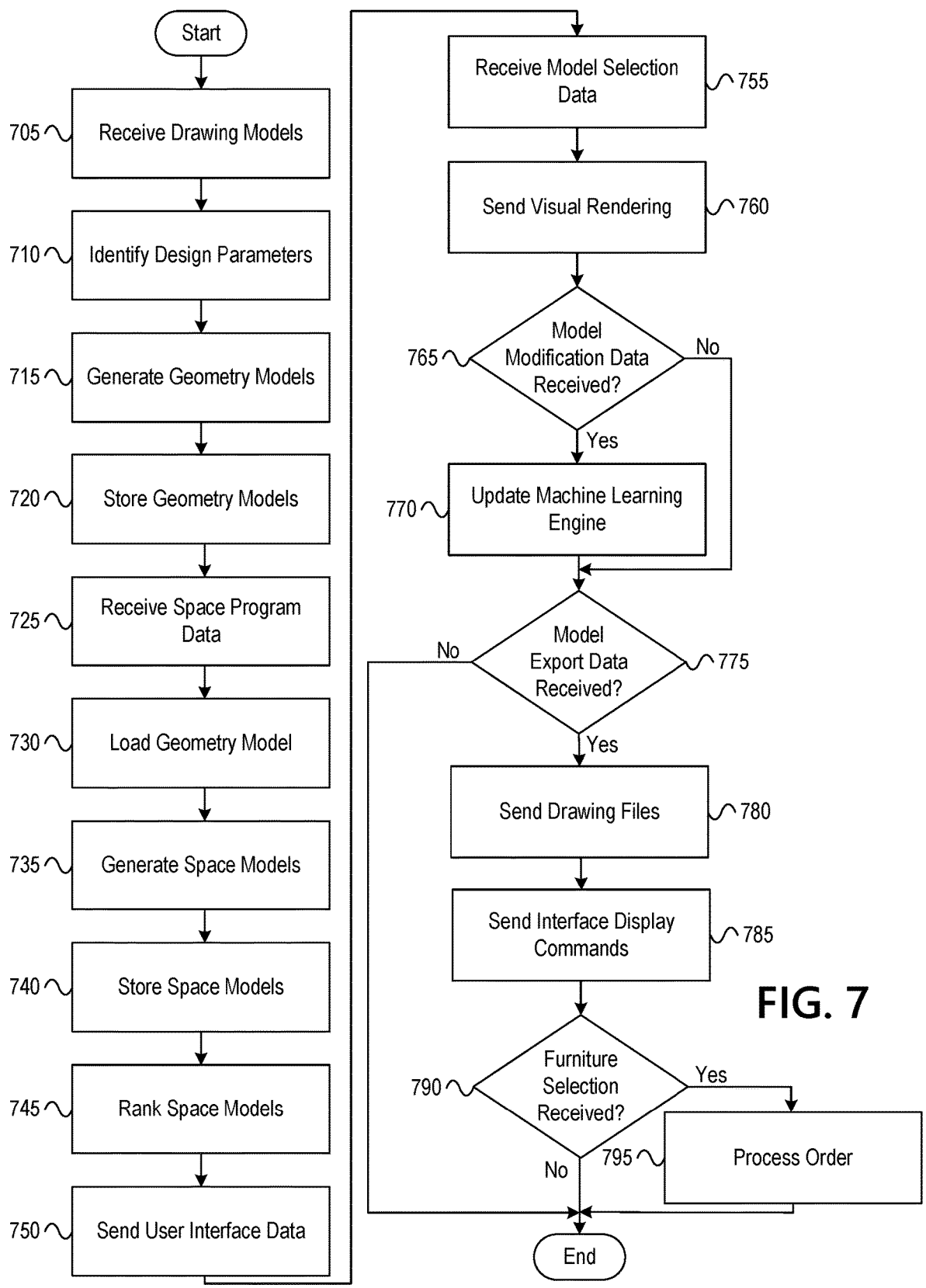
FIG. 7 depicts an illustrative method for generating space models and geometry models using a machine learning system with multi-platform interfaces in accordance with one or more example embodiments.

FIG. 7 depicts an illustrative method for generating space models and geometry models using a machine learning system with multi-platform interfaces in accordance with one or more example embodiments. Referring to FIG. 7, at step 705, a computing platform having at least one processor, a communication interface, and memory may receive one or more drawing models. At step 710, the computing platform may identify design parameters based on the one or more drawing models. At step 715, based on the design parameters, the computing platform may generate one or more geometry models. At step 720, the computing platform may store the geometry models. At step 725, the computing platform may receive space program data. At step 730, the computing platform may load one or more geometry models based on the space program data. At step 735, the computing platform may generate one or more space models based on the one or more geometry models and the space program data. At step 740, the computing platform may store the one or more space models. At step 745, the computing platform may score the one or more space models, and rank the one or more space models based on the scores. At step 750, the computing platform may send user interface data to a designer user computing device, which may cause the designer user computing device to display a graphical user interface that includes a ranked list of the one or more space models. At step 755, the computing platform may receive model selection data indicating selection of a first space model. At step 760, the computing platform may generate a visual rendering of the first space model and send the visual rendering to the designer user computing device. At step 765, the computing platform may determine whether or not data indicating a modification to the first space model was received. If not, the computing platform may proceed to step 775. If data indicating a modification to the first space model was received, the computing platform may proceed to step 770.

At step 770, the computing platform may update a machine learning engine used to generate the geometry models and/or the space models. At step 775, the computing platform may determine whether or not data requesting export of the first space model was received. If not, the method may end. If data requesting export of the first space model was received, the computing platform may proceed to step 780.

At step 780, the computing platform may send one or more drawing files based on the first space model in response to the export request. At step 785, the computing platform may send one or more commands directing a client user computing device to display a user interface that may prompt a user to select furniture (e.g., from the first space model) for purchase. At step 790, the computing platform may identify whether or not furniture selection data was received. If not, the method may end. If furniture selection data was received, the computing platform may proceed to step 795. At step 795, the computing platform may process an order corresponding to the furniture selection data.

Figure 9A:
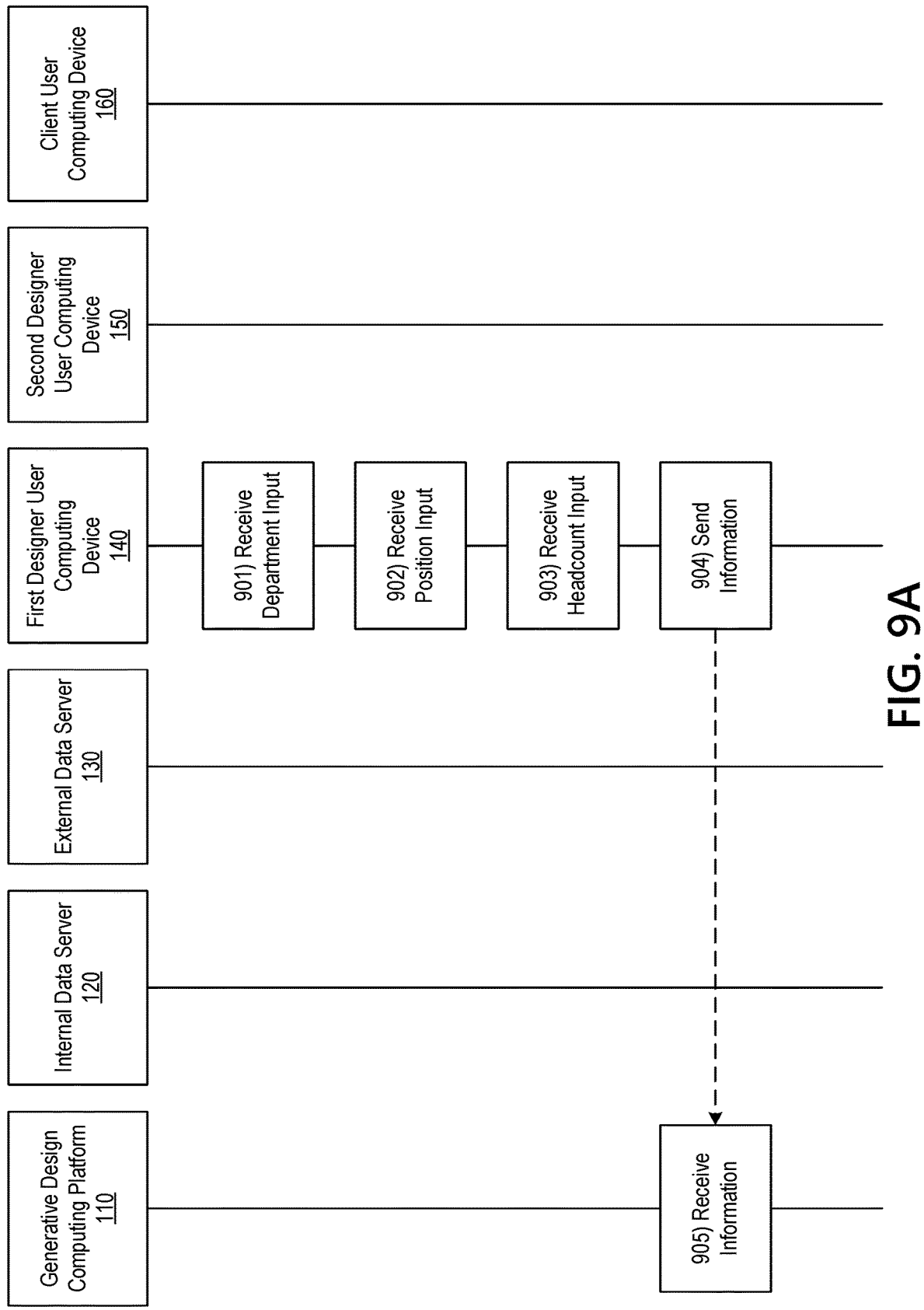

FIGS. 9A-9B depict an illustrative event sequence for providing workplace configuration interfaces in accordance with one or more example embodiments. Actions described in FIGS. 9A-9B may be performed in addition or as an alternative to the space program methods described above with regard to providing insights for a particular project. Referring to FIG. 9A, at step 901, first designer user computing device 140 may display a graphical user interface that enables input of department information, and may receive the department information through the graphical user interface. For example, the first designer user computing device 140 may receive input indicating which departments should be included in a final workplace configuration (e.g., executive, legal, finance, sales, marketing, communications, design, and/or other departments).

At step 902, the first designer user computing device 140 may display a graphical user interface that enables input of position information, and may receive the position information through the graphical user interface. For example, the first designer user computing device 140 may receive input indicating which positions correspond to the various departments (e.g., c-suite, executive, vice president, director, manager, staff, and/or other positions).

At step 903, the first designer user computing device 140 may display a graphical user interface that enables input of headcount information, and may receive the headcount information through the graphical user interface. For example, the first designer user computing device 140 may receive input indicating a number of employees at each position (identified at step 902) for each department (identified at step 901). As a particular example, the first designer user computing device 140 may receive input indicating that the legal department has two executives.

At step 904, the first designer user computing device 140 may communicate with the generative design computing platform 110 to share the information received at steps 901-903 (e.g., the department, position, and headcount information). At step 905, the generative design computing platform 110 may receive this information sent at step 904.

Referring to FIG. 9B, the generative design computing platform 110 may use the information received at step 905 to generate a workpoint configuration interface (or information that may be used to generate the workpoint configuration interface). For example, the generative design computing platform 110 may identify a total quantity of employees at each position, a corresponding default workspace for each position (e.g., office vs. workstation and it's corresponding size), square footage of a single corresponding workspace (e.g., a single office, workstation, or the like for the particular position), and square footage of the workspaces for all employees at each position (e.g., total square footage occupied by seven chief operating officers, each having an office of 275 square feet, is 1925 square feet). After identifying these metrics, the generative design computing platform 110 may identify a total square footage occupied by all anticipated employees across all positions/departments (e.g., by adding all of the identified total square footages for each role), and may then add group space size (e.g., meeting rooms, open collaborative rooms, and/or other group spaces), support space size (e.g., printer/copy areas, closets, local area network rooms, and/or other support spaces), and/or any other square footage to reach a total usable area square footage.

In some instances, in generating the workpoint configuration interface, the generative design computing platform 110 may include controls that may allow modification of breakpoint (e.g., at what position in a hierarchy are employees assigned an office vs. workstation), workpoint size (e.g., office or workstation size), and/or other parameters. For example, this may allow a user to modify a workpoint configuration so that only employees who are managers or above may have an office rather than employees who are supervisors and above. In doing so, the user may reduce a square footage occupied by employees at the supervisor level by moving them from offices to workstations. Additionally or alternatively, the workpoint configuration may be modified so as to reduce office size of employees at a particular role to reduce the square footage occupied by those employees. Conversely, a user may modify the workpoint configuration to increase a number of employees occupying offices and/or increase individual office sizes if there is extra usable area.

In some instances, the generative design computing platform 110 may generate one or more workpoint configuration options that include the information described above, and may include each option on the workpoint configuration interface. In this way, a user may identify which option is most desirable, and may modify that option as necessary.

By automatically generating these workpoint configuration options, the generative design computing platform 110 may conserve significant amounts of time that may otherwise be consumed by designing a complete test fit for a particular space and subsequently refining the fit as necessary based on whether or not it exceeds a total usable area of the space, does not use all of the total usable area of the space, and/or other factors.

In some instances, the generative design computing platform 110 may also generate cost estimates for each workplace configuration (e.g., based on a price per square footage from a corresponding lease and the identified total square footage for each workplace configuration). In doing so, the generative design computing platform 110 may enable a user to identify cost savings associated with each workplace configuration (e.g., the cost savings associated with a smaller space as compared to a larger space).

At step 907, the generative design computing platform 110 may send the workpoint configuration interface to the first designer user computing device 140 for display. At step 908, the first designer user computing device 140 may receive the workpoint configuration interface.

Figure 10:
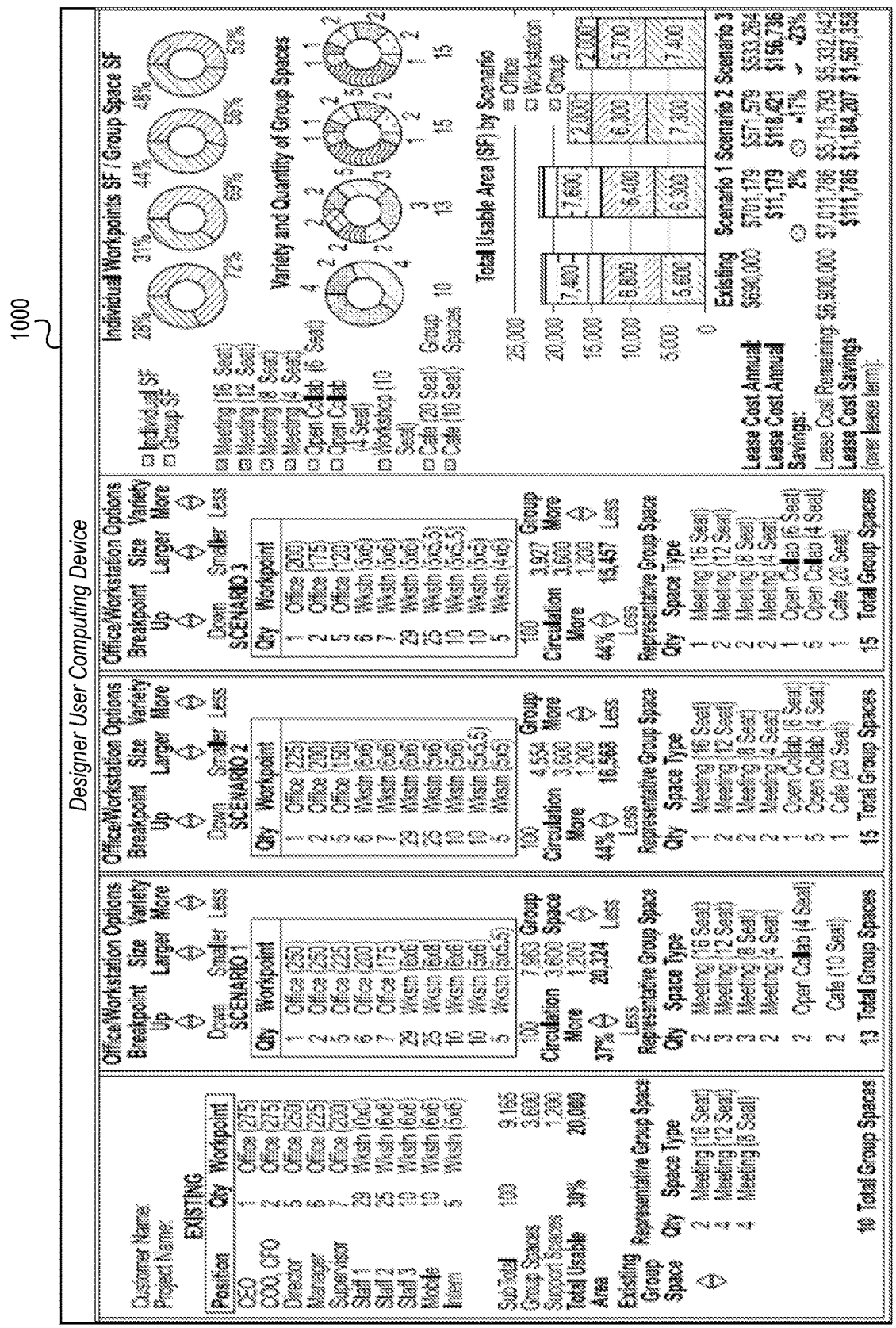
FIG. 10 depicts an illustrative workplace configuration interface in accordance with one or more example embodiments.

At step 909, the first designer user computing device 140 may display the workpoint configuration interface. For example, the first designer user computing device 140 may display a graphical user interface similar to graphical user interface 1000, which is illustrated in FIG. 10. For example, the first designer user computing device 140 may display a graphical user interface that enables a user to adjust workplace configurations as described above at step 906, and to observe the corresponding cost savings.

Although the above described systems, methods, and event sequence primarily illustrate a use case involving commercial office design, they may similarly apply to other use cases such as residential design, outdoor design, manufacturing facilities, or the like without departing from the scope of the disclosure. For example, the generative design computing platform 110 may execute one or more steps similar to those described above in generating space models for residential spaces, outdoor spaces, manufacturing facility spaces, and/or other types of spaces.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface; and
   memory storing computer-readable instructions that, when executed by the at least one processor, cause the computing platform to:
      receive, via the communication interface, from a first user computing device, first space program data identifying one or more parameters of a first physical space;
      load a first geometry model from a database storing one or more geometry models, wherein the first geometry model comprises information defining a first plurality of design rules, wherein loading the first geometry model from the database storing the one or more geometry models comprises selecting the first geometry model from a plurality of geometry models generated by the computing platform using a machine learning engine trained on one or more best-in-class space designs;
      generate a first plurality of space models for the first physical space based on the first space program data identifying the one or more parameters of the first physical space and the first geometry model;
      score, based on the first geometry model, the first plurality of space models generated for the first physical space, wherein scoring the first plurality of space models generated for the first physical space produces a score for each space model of the first plurality of space models;
      rank the first plurality of space models generated for the first physical space based on the score for each space model of the first plurality of space models, wherein ranking the first plurality of space models generated for the first physical space produces a ranked list of space models;
      generate user interface data comprising the ranked list of space models; and
      send, via the communication interface, to the first user computing device, the user interface data comprising the ranked list of space models, wherein sending the user interface data comprising the ranked list of space models to the first user computing device causes the first user computing device to display a user interface comprising at least a portion of the ranked list of space models.

2. The computing platform of claim 1, wherein receiving the first space program data identifying the one or more parameters of the first physical space comprises receiving information identifying architectural details of the first physical space, organization details for the first physical space, work style details for the first physical space, and budget details for the first physical space.

3. The computing platform of claim 1, wherein loading the first geometry model from the database storing the one or more geometry models comprises selecting the first geometry model based on the first space program data identifying the one or more parameters of the first physical space.

4. The computing platform of claim 1, wherein generating the first plurality of space models for the first physical space based on the first space program data identifying the one or more parameters of the first physical space and the first geometry model comprises:
   generating a plurality of block models for the first physical space;
   scoring the plurality of block models generated for the first physical space based on the first geometry model, wherein scoring the plurality of block models generated for the first physical space produces a score for each block model of the plurality of block models;
   selecting a subset of the plurality of block models based on the score for each block model of the plurality of block models;
   generating a plurality of settings models for the first physical space, wherein each settings model of the plurality of settings models corresponds to a particular block model of the subset of the plurality of block models;
   scoring the plurality of settings models generated for the first physical space based on the first geometry model, wherein scoring the plurality of settings models generated for the first physical space produces a score for each settings model of the plurality of settings models;
   selecting a subset of the plurality of settings models based on the score for each settings model of the plurality of settings models;
   generating a plurality of furniture models for the first physical space, wherein each furniture model of the plurality of furniture models corresponds to a particular settings model of the subset of the plurality of settings models;
   scoring the plurality of furniture models generated for the first physical space based on the first geometry model, wherein scoring the plurality of furniture models generated for the first physical space produces a score for each furniture model of the plurality of furniture models; and selecting a subset of the plurality of furniture models based on the score for each furniture model of the plurality of furniture models, wherein the subset of the plurality of furniture models corresponds to the first plurality of space models generated for the first physical space.

5. The computing platform of claim 4, wherein each block model of the plurality of block models indicates potential locations of different neighborhoods in the first physical space, each settings model of the plurality of settings models indicates potential locations of different work settings in the first physical space, and each furniture model of the plurality of furniture models indicates potential locations of different furniture items in the first physical space.

6. The computing platform of claim 1, wherein the score for each space model of the first plurality of space models indicates a level of compliance with one or more metrics defined by the first geometry model.

7. The computing platform of claim 1, wherein sending the user interface data comprising the ranked list of space models to the first user computing device further causes the first user computing device to display one or more of the scores determined for each space model of the first plurality of space models.

8. The computing platform of claim 1, wherein the memory stores additional computer-readable instructions that, when executed by the at least one processor, cause the computing platform to:

receive, via the communication interface, from the first user computing device, data indicating a selection of a first space model from the ranked list of space models;

in response to receiving the data indicating the selection of the first space model from the ranked list of space models, generate a visual rendering of the first space model; and send, via the communication interface, to the first user computing device, the visual rendering of the first space model, wherein sending the visual rendering of the first space model to the first user computing device causes the first user computing device to display a user interface comprising at least a portion of the visual rendering of the first space model.

9. The computing platform of claim 8, wherein the memory stores additional computer-readable instructions that, when executed by the at least one processor, cause the computing platform to:

receive, via the communication interface, from the first user computing device, data indicating a user modification of the first space model; and based on receiving the data indicating the user modification of the first space model, update the machine learning engine executed on the computing platform.

10. The computing platform of claim 8, wherein the memory stores additional computer-readable instructions that, when executed by the at least one processor, cause the computing platform to:

receive, via the communication interface, from the first user computing device, data indicating a request to export the first space model to a design tool;

in response to receiving the data indicating the request to export the first space model to the design tool, generate one or more drawing files based on the first space model; and send, via the communication interface, to the first user computing device, the one or more drawing files generated based on the first space model.

11. The computing platform of claim 1, wherein the memory stores additional computer-readable instructions that, when executed by the at least one processor, cause the computing platform to:

receive, via the communication interface, from a second user computing device, second space program data identifying one or more parameters of a second physical space;

load a second geometry model from the database storing the one or more geometry models, wherein the second geometry model comprises information defining a second plurality of design rules;

generate a second plurality of space models for the second physical space based on the second space program data identifying the one or more parameters of the second physical space and the second geometry model;

score, based on the second geometry model, the second plurality of space models generated for the second physical space, wherein scoring the second plurality of space models generated for the second physical space produces a score for each space model of the second plurality of space models;

rank the second plurality of space models generated for the second physical space based on the score for each space model of the second plurality of space models, wherein ranking the second plurality of space models generated for the second physical space produces a second ranked list of space models;

generate second user interface data comprising the second ranked list of space models; and send, via the communication interface, to the second user computing device, the second user interface data comprising the second ranked list of space models, wherein sending the second user interface data comprising the second ranked list of space models to the second user computing device causes the second user computing device to display a user interface comprising at least a portion of the second ranked list of space models.

12. A method, comprising:

at a computing platform comprising at least one processor, a communication interface, and memory:

receiving, by the at least one processor, via the communication interface, from a first user computing device, first space program data identifying one or more parameters of a first physical space;

loading, by the at least one processor, a first geometry model from a database storing one or more geometry models, wherein the first geometry model comprises information defining a first plurality of design rules, wherein loading the first geometry model from the database storing the one or more geometry models comprises selecting the first geometry model from a plurality of geometry models generated by the computing platform using a machine learning engine trained on one or more best-in-class space designs;

generating, by the at least one processor, a first plurality of space models for the first physical space based on the first space program data identifying the one or more parameters of the first physical space and the first geometry model;

scoring, by the at least one processor, based on the first geometry model, the first plurality of space models generated for the first physical space, wherein scoring the first plurality of space models generated for the first physical space produces a score for each space model of the first plurality of space models;

ranking, by the at least one processor, the first plurality of space models generated for the first physical space based on the score for each space model of the first plurality of space models, wherein ranking the first plurality of space models generated for the first physical space produces a ranked list of space models;

generating, by the at least one processor, user interface data comprising the ranked list of space models; and sending, by the at least one processor, via the communication interface, to the first user computing device, the user interface data comprising the ranked list of space models, wherein sending the user interface data comprising the ranked list of space models to the first user computing device causes the first user computing device to display a user interface comprising at least a portion of the ranked list of space models.

13. The method of claim 12, wherein receiving the first space program data identifying the one or more parameters of the first physical space comprises receiving information identifying architectural details of the first physical space, organization details for the first physical space, work style details for the first physical space, and budget details for the first physical space.

14. The method of claim 12, wherein loading the first geometry model from the database storing the one or more geometry models comprises selecting the first geometry model based on the first space program data identifying the one or more parameters of the first physical space.

15. The method of claim 12, wherein generating the first plurality of space models for the first physical space based on the first space program data identifying the one or more parameters of the first physical space and the first geometry model comprises:

generating a plurality of block models for the first physical space;

scoring the plurality of block models generated for the first physical space based on the first geometry model, wherein scoring the plurality of block models generated for the first physical space produces a score for each block model of the plurality of block models;

selecting a subset of the plurality of block models based on the score for each block model of the plurality of block models;

generating a plurality of settings models for the first physical space, wherein each settings model of the plurality of settings models corresponds to a particular block model of the subset of the plurality of block models;

scoring the plurality of settings models generated for the first physical space based on the first geometry model, wherein scoring the plurality of settings models generated for the first physical space produces a score for each settings model of the plurality of settings models;

selecting a subset of the plurality of settings models based on the score for each settings model of the plurality of settings models;

generating a plurality of furniture models for the first physical space, wherein each furniture model of the plurality of furniture models corresponds to a particular settings model of the subset of the plurality of settings models;

scoring the plurality of furniture models generated for the first physical space based on the first geometry model, wherein scoring the plurality of furniture models generated for the first physical space produces a score for each furniture model of the plurality of furniture models; and selecting a subset of the plurality of furniture models based on the score for each furniture model of the plurality of furniture models, wherein the subset of the plurality of furniture models corresponds to the first plurality of space models generated for the first physical space.

16. The method of claim 15, wherein each block model of the plurality of block models indicates potential locations of different neighborhoods in the first physical space, each settings model of the plurality of settings models indicates potential locations of different work settings in the first physical space, and each furniture model of the plurality of furniture models indicates potential locations of different furniture items in the first physical space.

17. The method of claim 12, wherein the score for each space model of the first plurality of space models indicates a level of compliance with one or more metrics defined by the first geometry model.

18. One or more non-transitory computer-readable media storing instructions that, when executed by a computing platform comprising at least one processor, a communication interface, and memory, cause the computing platform to:

receive, via the communication interface, from a first user computing device, first space program data identifying one or more parameters of a first physical space;

load a first geometry model from a database storing one or more geometry models, wherein the first geometry model comprises information defining a first plurality of design rules, wherein loading the first geometry model from the database storing the one or more geometry models comprises selecting the first geometry model from a plurality of geometry models generated by the computing platform using a machine learning engine trained on one or more best-in-class space designs;

generate a first plurality of space models for the first physical space based on the first space program data identifying the one or more parameters of the first physical space and the first geometry model;

score, based on the first geometry model, the first plurality of space models generated for the first physical space, wherein scoring the first plurality of space models generated for the first physical space produces a score for each space model of the first plurality of space models;

rank the first plurality of space models generated for the first physical space based on the score for each space model of the first plurality of space models, wherein ranking the first plurality of space models generated for the first physical space produces a ranked list of space models;

generate user interface data comprising the ranked list of space models; and send, via the communication interface, to the first user computing device, the user interface data comprising the ranked list of space models, wherein sending the user interface data comprising the ranked list of space models to the first user computing device causes the first user computing device to display a user interface comprising at least a portion of the ranked list of space models.

* * * * *